(12) United States Patent
Baker et al.

(10) Patent No.: US 8,463,881 B1
(45) Date of Patent: Jun. 11, 2013

(54) BRIDGING MECHANISM FOR PEER-TO-PEER COMMUNICATION

(75) Inventors: Paul A. Baker, Los Altos, CA (US); Michael W. Murphy, Menlo Park, CA (US); Eric Werner Anderson, Cupertino, CA (US); Colin Whitby-Strevens, Ben Lomond, CA (US); David Ferguson, Sunnyvale, CA (US); Keith Diefendorff, Los Gatos, CA (US); Ron Hochsprung, Los Gatos, CA (US); William Cornelius, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 464 days.

(21) Appl. No.: 12/239,743

(22) Filed: Sep. 27, 2008

Related U.S. Application Data

(60) Provisional application No. 60/997,248, filed on Oct. 1, 2007.

(51) Int. Cl.
 *G06F 15/177* (2006.01)
(52) U.S. Cl.
 USPC ............................ 709/220; 709/226; 709/229
(58) Field of Classification Search
 USPC ................. 709/204, 205, 206, 207, 208, 209, 709/211, 220, 221, 222, 227, 228, 229, 249
See application file for complete search history.

(56) References Cited

U.S. PATENT DOCUMENTS

| | | | |
|---|---|---|---|
| 5,228,035 A | 7/1993 | Hirato et al. | |
| 5,313,465 A * | 5/1994 | Perlman et al. | 370/254 |
| 5,711,686 A | 1/1998 | O'Sullivan et al. | |
| 6,029,137 A * | 2/2000 | Cordery et al. | 705/60 |
| 6,485,335 B1 | 11/2002 | Dewdney | |
| 6,653,813 B2 | 11/2003 | Khatri | |
| 6,792,474 B1 * | 9/2004 | Hopprich et al. | 709/245 |
| 6,798,790 B1 | 9/2004 | Enssle et al. | |
| 7,033,219 B2 | 4/2006 | Gordon et al. | |
| 7,174,413 B2 * | 2/2007 | Pettey et al. | 710/317 |
| 7,188,209 B2 * | 3/2007 | Pettey et al. | 710/317 |
| 7,197,549 B1 * | 3/2007 | Salama et al. | 709/223 |
| 7,219,183 B2 * | 5/2007 | Pettey et al. | 710/316 |
| 7,255,602 B1 | 8/2007 | Driessen et al. | |

(Continued)

FOREIGN PATENT DOCUMENTS

| | | |
|---|---|---|
| EP | 1202419 A1 | 5/2002 |
| EP | 2090955 A1 | 8/2009 |

(Continued)

OTHER PUBLICATIONS

Display Port, Wikipedia, the free encyclopedia, 4 pages; printed on Aug. 29, 2008 from http://en.wikipedia.org/wiki/Displayport; page states it was last modified on Aug. 25, 2008.

(Continued)

*Primary Examiner* — Dhairya A Patel
(74) *Attorney, Agent, or Firm* — Kilpatrick Townsend & Stockton

(57) ABSTRACT

A high-speed optical interface for connecting computers to external I/O devices allows a number of native I/O formats to be encapsulated into PCIe Vendor Defined Messages ("VDMs") for transfer over a single physical medium, preferably optical, and is thus referred to as the converged I/O ("CIO") interface. Standard PCIe bridges are modified to support peer-to-peer communications, allowing greater exploitation of the capabilities of PCIe.

20 Claims, 24 Drawing Sheets

U.S. PATENT DOCUMENTS

| | | | |
|---|---|---|---|
| 7,366,182 B2 * | 4/2008 | O'Neill | 370/395.53 |
| 7,422,471 B1 | 9/2008 | Wu | |
| 7,447,922 B1 | 11/2008 | Asbury et al. | |
| 7,466,712 B2 * | 12/2008 | Makishima et al. | 370/401 |
| 7,480,303 B1 * | 1/2009 | Ngai | 370/395.5 |
| 7,562,176 B2 * | 7/2009 | Kloeppner et al. | 710/314 |
| 7,587,575 B2 * | 9/2009 | Moertl et al. | 711/206 |
| 7,689,755 B2 * | 3/2010 | Balasubramanian et al. | 710/311 |
| 7,860,205 B1 | 12/2010 | Aweya et al. | |
| 8,312,302 B2 | 11/2012 | Baker et al. | |
| 8,327,536 B2 | 12/2012 | Kim et al. | |
| 2002/0010799 A1 * | 1/2002 | Kubota et al. | 709/249 |
| 2002/0093935 A1 | 7/2002 | Denney et al. | |
| 2003/0137997 A1 | 7/2003 | Keating | |
| 2004/0023645 A1 | 2/2004 | Olsen et al. | |
| 2004/0080544 A1 * | 4/2004 | Stripling | 345/816 |
| 2004/0115988 A1 | 6/2004 | Wu | |
| 2005/0060470 A1 | 3/2005 | Main et al. | |
| 2005/0060480 A1 | 3/2005 | Solomon | |
| 2005/0111362 A1 | 5/2005 | Freytsis et al. | |
| 2005/0147119 A1 | 7/2005 | Tofano | |
| 2005/0238035 A1 | 10/2005 | Riley | |
| 2005/0262269 A1 | 11/2005 | Pike | |
| 2006/0029038 A1 * | 2/2006 | Jungck | 370/351 |
| 2006/0083518 A1 | 4/2006 | Lee et al. | |
| 2006/0092928 A1 | 5/2006 | Pike et al. | |
| 2006/0168387 A1 | 7/2006 | Gan et al. | |
| 2006/0200600 A1 | 9/2006 | Groso | |
| 2006/0206655 A1 * | 9/2006 | Chappell et al. | 710/315 |
| 2006/0288098 A1 | 12/2006 | Singh et al. | |
| 2007/0025481 A1 | 2/2007 | Ryu et al. | |
| 2007/0086487 A1 | 4/2007 | Yasuda et al. | |
| 2008/0079462 A1 | 4/2008 | Chiu et al. | |
| 2008/0091857 A1 | 4/2008 | McDaniel | |
| 2008/0117909 A1 | 5/2008 | Johnson | |
| 2008/0147898 A1 * | 6/2008 | Freimuth et al. | 710/8 |
| 2008/0172501 A1 | 7/2008 | Goodart et al. | |
| 2008/0195747 A1 | 8/2008 | Elmaliah | |
| 2008/0250175 A1 | 10/2008 | Sheafor | |
| 2008/0279186 A1 | 11/2008 | Winter et al. | |
| 2009/0003335 A1 | 1/2009 | Biran et al. | |
| 2009/0003361 A1 | 1/2009 | Bakthavathsalam | |
| 2009/0006710 A1 | 1/2009 | Daniel et al. | |
| 2009/0016348 A1 | 1/2009 | Norden et al. | |
| 2009/0022176 A1 | 1/2009 | Nguyen | |
| 2009/0037606 A1 | 2/2009 | Diab | |
| 2009/0063701 A1 | 3/2009 | Bagepalli et al. | |
| 2009/0070775 A1 | 3/2009 | Riley | |
| 2009/0222924 A1 * | 9/2009 | Droz et al. | 726/24 |
| 2010/0014598 A1 | 1/2010 | Pfeifer | |
| 2010/0046590 A1 | 2/2010 | Harper et al. | |
| 2010/0185792 A1 | 7/2010 | Yao et al. | |
| 2012/0000703 A1 | 1/2012 | Kim et al. | |
| 2012/0000705 A1 | 1/2012 | Cornelius et al. | |
| 2012/0005496 A1 | 1/2012 | Baker et al. | |
| 2012/0103651 A1 | 5/2012 | Kim | |
| 2012/0104543 A1 | 5/2012 | Shahoian | |
| 2012/0106018 A1 | 5/2012 | Shahoian et al. | |
| 2012/0152613 A1 | 6/2012 | Kim et al. | |
| 2012/0215950 A1 | 8/2012 | Anderson | |
| 2012/0233489 A1 | 9/2012 | Cornelius et al. | |

FOREIGN PATENT DOCUMENTS

| | | |
|---|---|---|
| JP | H08-265600 | 10/1996 |
| JP | 2001-109697 A | 4/2001 |
| JP | 2003-189263 A | 7/2003 |
| JP | 2005-309744 A | 11/2005 |
| JP | 2007-251779 A | 9/2007 |
| JP | 2008-252310 A | 10/2008 |
| WO | 2006/102606 A2 | 9/2006 |
| WO | 2006/102606 A3 | 9/2006 |
| WO | WO 2007099507 A2 * | 9/2007 |
| WO | 2009/039287 A2 | 3/2009 |
| WO | 2009/039287 A3 | 3/2009 |
| WO | 2009/046617 A1 | 4/2009 |
| WO | 2009/086566 A1 | 7/2009 |
| WO | 2010/051281 A2 | 5/2010 |
| WO | 2010/051281 A3 | 5/2010 |
| WO | 2012/003347 A1 | 1/2012 |
| WO | 2012/003381 A2 | 1/2012 |
| WO | 2012/003385 A1 | 1/2012 |

OTHER PUBLICATIONS

Dopplinger, A., et al. "Using IEEE 1588 for synchronization of network-connected devices", Mar. 29, 2007, from www.embedded.com/columns/technicalinsights/, 7 pages.

Ethernet, Wikipedia, the free encyclopedia, 9 pages; printed on Aug. 17, 2008, from http://en.wikipedia.org/wiki/Ethernet; page states it was last modified on Aug. 17, 2008.

IDT 24-Lane 3-Port PCI Express, 89HPES24N3 Data Sheet, Jul. 18, 2006, 30 pages.

IEEE 1394 interface, Wikipedia, the free encyclopedia, 7 pages; printed on Jul. 24, 2008 from http://en.wikipedia.org/wiki/Firewire; page states it was last modified on Jul. 23, 2008.

PCI Express, Wikipedia, the free encyclopedia, 11 pages; printed on Jul. 24, 2008 from http://en.wikipedia.org/wiki/PCI-Express; page states it was last modified on Jul. 16, 2008.

PCI Express Architecture, Chapter 3, Address Spaces & Transaction Routing, from PCIEX.book, pp. 105-152, Aug. 5, 2003.

PCI Express Base Specification Revision 1.0a, Apr. 15, 2003, pp. 1-426.

PCI-X, Wikipedia, the free encyclopedia, 4 pages; printed on Ssep. 9, 2008 from http://en.wikipedia.org/wiki/PCI-X; page states it was last modified on Sep. 4, 2008.

Peer-to-peer, Wikipedia, the free encyclopedia, 11 pages; printed on Jul. 24, 2008 from http://en.wikipedia.org/wiki/Peer-to-peer; page states it was last modified on Jul. 24, 2008.

Peripheral Component Interconnect, Wikipedia, the free encyclopedia, 7 pages; printed on Jul. 24, 2008, from http://en.wikipedia.org/wiki/PCI_%28bus%29; page states it was last modified on Jul. 23, 2008.

Universal Serial Bus, Wikipedia, the free encyclopedia, 17 pages; printed on Jul. 24, 2008 from http://en.wikipedia.org/wiki/USB; page states it was last modified on Jul. 23, 2008.

VESA DisplayPort Standard, Version 1, Revision 1a, Jan. 11, 2008, 238 pages.

U.S. Appl. No. 12/239,742, filed Sep. 27, 2008, Baker et al.

International Search Report and Written Opinion for Application No. PCT/US2011/042634 mailed on Nov. 30, 2011, 20 pages.

International Search Report and Written Opinion for Application No. PCT/US2011/042684 mailed on Jan. 31, 2012, 18 pages.

International Search Report and Written Opinion for Application No. PCT/US2011/042689 mailed on Sep. 28, 2011, 23 pages.

Non-Final Office Action for U.S. Appl. No. 12/239,742, mailed on Dec. 7, 2012, 10 pages.

Office Action for Japanese Patent Application No. 2012-543350, mailed on Dec. 28, 2012, in 4 pages.

* cited by examiner

BRIDGING MECHANISM FOR PEER-TO-PEER COMMUNICATION

CROSS REFERENCE TO RELATED APPLICATIONS

This application claims the benefit of U.S. Patent Application No. 60/997,248 filed Oct. 1, 2007 for "Converged Computer I/O System and Bridging Mechanism for Peer-to-Peer Communication" (inventors Paul A. Baker, Michael W. Murphy, Eric Werner Anderson, Colin Whitby-Strevens, David Ferguson, Keith Diefendorff, and Ron Hochsprung, the entire disclosure of which is herein incorporated by reference in its entirety for all purposes The present application incorporates by reference for all purposes the entire contents of U.S. patent application Ser. No. 12/239,742, titled CONVERGED COMPUTER I/O SYSTEM, filed Sep. 27, 2008.

BACKGROUND OF THE INVENTION

The present invention is relates generally to network communications, and more particularly to peer-to-peer communications.

The Peripheral Component Interconnect ("PCI") is a well established and widely deployed standard that specifies a computer bus for attaching peripheral devices to a computer motherboard. Successor standards such as PCI-X, which stands for Peripheral Component Interconnect Extended, have increased the bandwidth and addressed perceived shortcomings.

PCI Express, officially abbreviated as PCI-E or PCIe, is a serial packet-based protocol that provides higher yet transfer speeds, and addresses additional perceived shortcomings of PCI and PCI-X. PCIe infrastructure is also well established and provides a network architecture. One thing lacking is support for peer-to-peer connections between computer systems (domains).

SUMMARY OF THE INVENTION

Embodiments of the present invention provide support for peer-to-peer connections between domains while retaining much of the structure and organization of PCIe hardware and software.

Embodiments of the present invention are capable of being implemented in the context of a high-speed optical interface for connecting computers to external I/O devices. The interface allows a number of native I/O formats to be encapsulated into PCIe Vendor Defined Messages ("VDMs") for transfer over a single physical medium, preferably optical, and is thus referred to as the converged I/O ("CIO") interface. Standard PCIe bridges are modified to support peer-to-peer communications, allowing greater exploitation of the capabilities of PCIe.

A further understanding of the nature and advantages of the present invention may be realized by reference to the remaining portions of the specification and the drawings.

BRIEF DESCRIPTION OF THE DRAWINGS

FIG. 38 FIGS. 38A and 38B illustrate embodiments where certain functions are carried out in software.

DESCRIPTION OF SPECIFIC EMBODIMENTS

Embodiments of the present invention provide a high-speed optical interface for connecting computers to external I/O devices, including in some instances devices having bandwidth requirement in excess of common external interfaces. In a preferred embodiment, the interface is largely based on the industry-standard PCI Express ("PCIe") interface, with extensions discussed below to provide additional functionality. The interface allows a number of native I/O formats to be encapsulated into PCIe Vendor Defined Messages ("VDMs") for transfer over a single physical medium, preferably optical, and is thus referred to as the converged I/O ("CIO") interface. In a specific implementation, optical links between devices support high-speed serial communications, and the data is in the form of PCIe packets.

Figure 1:
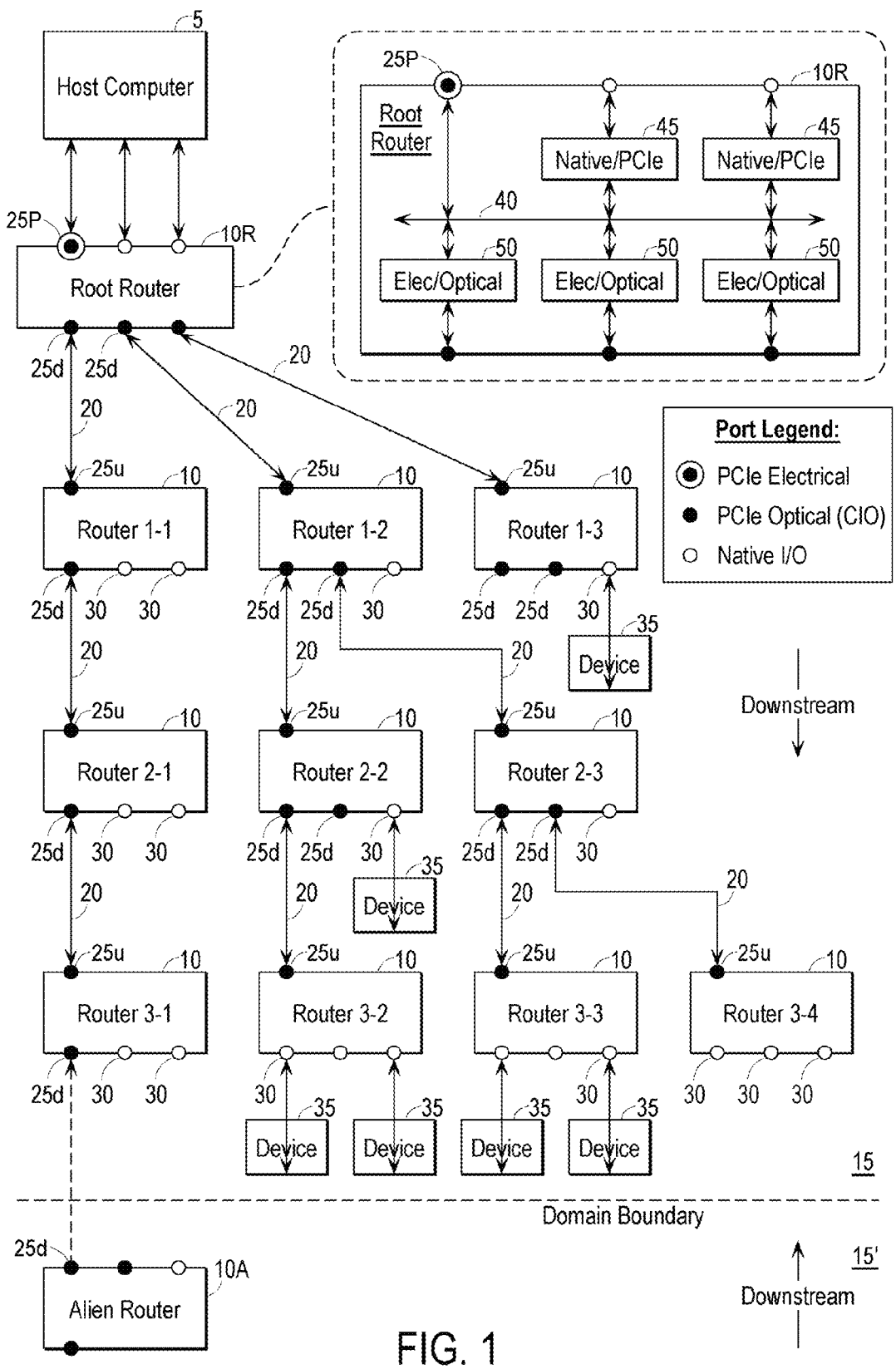
FIG. 1 is a block diagram of a representative system incorporating a converged I/O ("CIO") interface according to embodiments of the present invention.

FIG. 1 is a block diagram of a representative system according to embodiments of the present invention. The system includes a host computer 5 connected to a network of routers that includes a master or root router 10R and one or more downstream routers 10 (the figure shows multiple downstream routers). These routers are disposed in a domain 15, and are directly connected to each other by links 20, and communicate with one another by exchanging packets according to an extended PCIe protocol. The routers and links use the CIO interface; thus the routers are sometimes referred to as CIO routers and the links as CIO links.

Each router has one or more CIO ports 25, each of which can terminate a CIO link. CIO ports 25 are shown as solid black circles. Some of the routers have downstream-facing non-CIO ports 30, which are shown as hollow white circles. These will be discussed below. As a matter of terminology, when a first router's port is connected to a second router's port, that second router's port is sometimes referred to as the first router's linked port, and the first router's port is referred to as the second router's linked port.

Each port has associated port circuitry within the router that allows signals incoming at one port to be communicated to corresponding port circuitry of another port to be output from that other port. Since the internal signaling in the router is electrical, and the preferred CIO communication medium is optical, each CIO port has additional associated interface circuitry that includes an electro-optical element that converts electrical signals from the router to optical signals for output on the optical CIO links, and an opto-electrical element that converts optical signals on the CIO links to electrical signals for use by the router.

The routers are in a tree topology, which includes root router 10R at its root and one or more (the figure shows multiple) downstream routers. For definiteness, root router 10R is shown at the top of the figure, and the downstream routers 10 are shown below the root router. Upstream-facing CIO ports 25 are shown with a suffix "u" and downstream-facing CIO ports 25 are shown with a suffix "d." Every downstream router has an upstream-facing CIO port. Root router 10R does not have an upstream-facing CIO port, but has an upstream-facing PCIe port 25P (shown as a black circle centered in a white circle) that communicates with host computer 5. This provides the host computer access to the network of routers for configuration as well as memory writes and reads to and from devices connected to the routers.

While every router except the root router has an upstream-facing CIO port, routers need not have any downstream-facing CIO ports. FIG. 1 shows a number of possibilities, e.g., some routers have no downstream-facing CIO ports, some have one downstream-facing CIO port, and some have multiple downstream-facing CIO ports. The links are shown as bidirectional, but this is for simplicity; each link is composed of separate upstream and downstream unidirectional paths.

Every downstream router is directly connected via its upstream-facing port to the downstream-facing port of one and only one upstream router. Every downstream router is connected directly or indirectly (through one or more upstream routers) to the root router. Thus every downstream router has a unique path connecting it to the root router. Within the tree topology, leaf routers, namely routers that are not connected to any downstream routers, have an upstream-facing CIO port and may or may not have downstream-facing CIO ports. Each router that is not a leaf router has at least one downstream-facing CIO port.

Embodiments of the present invention provide for encapsulating (tunneling) native (non-PCIe) I/O formats within PCIe packets. To support this capability, some of the downstream routers are shown as having downstream-facing non-CIO ports 30, which are shown as hollow white circles. The non-CIO ports are for input and/or output of native I/O signals (e.g., USB, FireWire, Ethernet, PCIe, DisplayPort, DVI), as will be discussed in detail below. A number of non-CIO ports 30 are shown as having attached devices 35. The root router is also shown with two upstream-facing non-CIO ports, but they are for transport only and are not used to communicate control information.

The functionality of each router is that it can route signals at any port to any other port (CIO or non-CIO). However, as mentioned above, embodiments of the present invention support multiple stream types being carried over links in the network. Therefore, a transaction makes sense when the data is compatible with the destination to which it is being routed (e.g., while a router could direct USB data to a DisplayPort connection, there is little reason to carry out such a transaction).

For convenience, downstream routers 10 are labeled with a pair of numbers separated by a hyphen. The first number designates the level or distance to root router 10R, and the second number enumerates the routers at that level. In the particular scheme shown, the second number increases from left to right in the figure. Configuration and routing will be described in further detail below, but a preferred implementation uses a PCIe-type addressing scheme (extended to support some additional functionality). Thus elements within the routers are configured to understand which address ranges map to which ports. Consider an example where an I/O controller associated with host computer 5 wishes to establish a connection with a target device, say the lowermost, rightmost device in the figure.

To accomplish this, the host emits a packet that includes the target device's address, and provides that packet to port 25P. When the target device's address in the packet is presented to root router 10R, the middle CIO port of the root router recognizes that address as one that it is authorized to pass, and the packet is output from the middle CIO port of the root router and sent to router 1-2. In a similar manner, when the target device's address in the packet is presented to router 1-2, the packet is output from the middle (CIO) port of the router 1-2 and sent to router 2-3. In a similar manner, when the target device's address in the packet is presented to router 2-3, the packet is output from the left CIO port of router 2-3 and sent to router 3-3. In a similar manner, when the target device's address in the packet is presented to router 3-3, the packet is output from the right non-CIO port of router 3-3 and sent to the addressed device or otherwise used to access the addressed device.

In the above addressing mechanism, the information being sent contains an address, and each router receiving the information with that address determines which port is configured to accept that address. An alternative technique can establish the entire path as soon as the destination is known. Thus for the same example, a path can be established from the middle CIO port of the root router to router 1-2, from the middle (CIO) port of router 1-2 to router 2-3, from the leftmost CIO port of router 2-3 to router 3-3, and then from the rightmost non-CIO port of router 3-3 to the device.

FIG. 1 shows a second domain 15' below a domain boundary (denoted by a dashed line). Some embodiments of the present invention support inter-domain (peer-to-peer) connection where a router in one domain (in this case router 3-1) connects via one of its downstream-facing CIO ports to a downstream-facing CIO port of an alien router 10A in the other domain. Since domain 15' is drawn below domain 15, the downstream direction for domain 15' is up. With the exception of such peer-to-peer connections, a downstream-facing CIO port connects only to the upstream-facing port of a downstream CIO router. While router 3-1 happens to be a leaf router, the router that connects to a router in a different domain may or may not be a leaf router.

Peer-to-peer communications will be described in detail below. At this point it suffices to note that PCIe addressing does not support peer-to-peer connections. This functionality is provided by extending the PCIe addressing scheme to specify that a portion of the address identify an alien domain, and that extra logic (hardware and/or software) is used to implement the extension to the addressing scheme. A domain can be referred to in some contexts as a locus or a cloud.

FIG. 1 also shows additional details of root router 10R, but the details can easily be seen to apply to any of the other routers. The router includes an internal bus 40, and an arbitration mechanism determines when packets, which are stored in FIFOs (not shown) at the receiving sides of the different ports, are granted use of the bus so they can be routed to the appropriate port for output. Thus the bus can also be viewed as implementing a switch fabric. The signals passing through a given router (i.e., when they are inside the router) are, in specific embodiments of the present invention, PCIe electrical signals, while the signals incoming to the ports or outgoing from the ports are either native electrical signals or optical PCIe (CIO) signals.

Accordingly, each port except root router 10R's upstream-facing PCIe port 25P has associated circuitry for translating between PCIe and other formats. More particularly, each of non-CIO ports 30 has associated PCIe/native translation circuitry 45 and each of CIO ports 25 has an associated electrical/optical translation unit 50. Thus, incoming native (non-PCIe) signals are translated to PCIe signals for processing inside the router, and outgoing PCIe signals are translated to the native I/O format prior to those signals being output on the non-CIO port. Similarly, incoming optical signals are converted to electrical PCIe signals for processing inside the router, and outgoing PCIe signals are converted to optical signals for output on the CIO port.

The root router as shown in FIG. 1 could be replicated and deployed at other points in the network. However, one of the CIO ports would have to be the upstream-facing port, and the non-CIO ports could be used to provide the native I/O signals to devices such as disk drives, displays, or other peripherals (shown schematically as devices 35). The PCIe port would be downstream-facing, and would allow PCIe devices to be deployed at these different points within the network. The PCIe signals exiting PCIe port 25 would not need to be translated by the router into a different format. As well as supporting native PCIe devices, provision of the PCIe port as a downstream-facing port can also support devices that have their own built-in PCIe-to-native translation circuitry. For example, the host could communicate with a FireWire device that had its own PCIe-to-FireWire conversion circuitry without having to provide native FireWire signaling and without the routers having to contain PCIe-to-FireWire translation circuitry.

Figure 2:
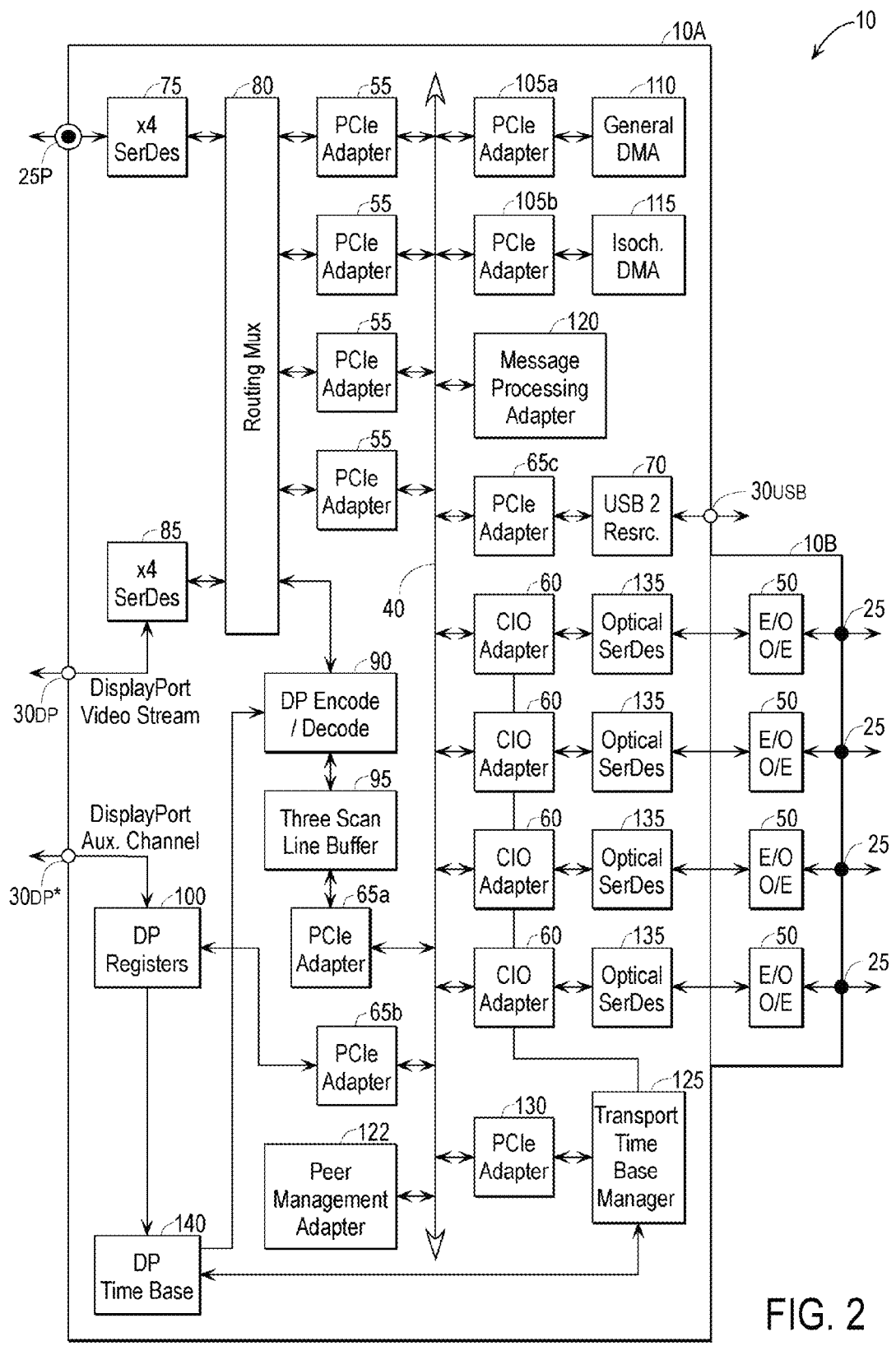
FIG. 2 is a block diagram showing additional details of a CIO router according to embodiments of the present invention.

FIG. 2 is a block diagram showing additional details of a representative CIO router 10 according to embodiments of the present invention. Where appropriate, elements corresponding to those shown in FIG. 1 are labeled with the same reference numerals used to label those elements in FIG. 1. For definiteness, the particular router shown has a PCIe port 25P, four CIO ports 25, and three non-CIO ports, a DP port 30DP for handling DisplayPort ("DP") streams, an auxiliary DP port 30DP* for handling the DP auxiliary channel, and a USB port 30USB for handling USB communications. While this particular router resembles root router 10R, and indeed could be used to implement the root router, it can also be used to implement any of the downstream routers. The router is in general bidirectional, but only one of the CIO ports can be upstream-facing (unless it is the root router, in which case the PCIe port would be the upstream-facing port).

Router 10 is shown as including two separate assemblies 10A and 10B. This schematically represents a specific embodiment of the present invention where the majority of the electronic components of the router are implemented in an integrated circuit (semiconductor chip) and the elements for converting electrical signals to optical signals and vice versa are implemented as a separate module (10B) that includes four instances of the electrical/optical translation units 50 of FIG. 1. While most of the connections inside the router are shown schematically as bidirectional, this is for simplicity; most of the connections include separate upstream and downstream unidirectional paths. Further, the ports as drawn represent logically distinct entities. This does not mean to say, for example, that some ports cannot share portions of the same physical connector. For example, the two DP ports can be part of the same physical connector with different pins for the DP stream channel and the auxiliary channel. In a preferred implementation, the electrical USB port connector can be integrated with the optical CIO connector. In such an implementation, the plugs on a cable that effects a CIO link can have the form factor of a USB "type-A" connector.

Every path that transfers incoming data from a port to bus 40 includes an adapter, and every path that transfers outgoing data from the bus to a port includes an adapter. In particular, Four PCIe adapters 55 are associated with PCIe port 25P; four CIO adapters 60 are associated with respective ones of the four CIO ports 25, a pair of PCIe adapters 65a and 65b are associated with DP ports 30DP and 30DP*, and a PCIe adaptor 65c is associated with USB port 30USB. The PCIe adaptors include standard PCIe bridges (not separately shown) that have upstream-facing configuration registers, that store address ranges for the port, and FIFOs for storing incoming packets.

In accordance with specific embodiments of the present invention, the CIO adapters include standard PCIe bridges (not separately shown) that are modified to support peer-to-peer communications. One aspect of the modification is to provide an additional set of configuration registers that face downstream (the normal PCIe configuration registers can only be accessed from upstream). The CIO adapters provide the functionality of the PCIe adapters (e.g., PCIe bridges modified to support peer-to-peer communications), and in some embodiments are further modified to support special synchronization communications, to be discussed below, that are carried out between linked CIO ports.

A USB resource such as a host controller 70 is connected between PCIe adapter 65c and USB port 30USB, and provides USB/PCIe encoding and decoding. While USB host controller 70 is shown as connected to a single non-CIO port, it can be configured to provide multiple ports. Thus, the controller can fan out to provide electrical USB ports integrated with multiple CIO port connectors and any internal USB needs of a device containing the router. Additional adapters and circuitry will be discussed in their particular context.

Each of these PCIe adapters includes a PCIe bridge facing bus 40, so the back-to-back pairs of bridges provide the functionality of a PCIe switch. Each bridge includes registers storing the address ranges that it can accept, and the adapter includes logic for determining whether the attached port is authorized to accept data based on address information associated with the data. The adapters also can include one or more FIFOs for storing incoming packets. The adapters are bidirectional devices, but a given adapter can provide different functionality depending on whether it is before the bus or after the bus relative to the data flow. Additional details will be discussed below in connection with describing how data incoming at a specific port is handled, and much of the information will be relevant to the other ports. The modifications of otherwise standard PCIe bridges to provide additional functionality can be implemented by additional hardware, software, or a combination.

Each of PCIe adapters 55, CIO adapters 60, PCIe adapters 65a and 65b, PCIe adapter 70 contains ingress circuitry that operates on data entering the router from a port and egress circuitry that operates on data leaving the router. Ingress circuitry examines the data, extracts packet headers, stores packets (including headers and payload, if any) in FIFOs (not shown), and communicates available FIFO space (via credit messages) to the egress circuitry at the port at the other end of its link (referred to as its linked port). Packet header information is placed on the bus and examined by egress circuitry in other adapters on the bus. These adapters are configured with ranges of addresses that they are authorized to accept, and also maintain credit information representing available space in the FIFOs at their linked ports.

An adapter's egress circuitry includes a queue (not shown) for holding outgoing events. When the egress circuitry detects an authorized address, it adds information regarding the event (e.g., port holding the data and size of the message) to the end of its queue. When the event reaches the front of the queue, and the egress circuitry further determines that its linked port's ingress circuitry's FIFOs have sufficient space to accept the packets, the egress circuitry requests use of the bus for transferring the data held in the FIFOs of the ingress port that had posted that address. When use of the bus is granted, the data flows from the port holding the data, onto the bus, and out of the output port.

Consider first, PCIe serial data incoming to PCIe port 25P with address information specifying one of CIO ports 25 or non-CIO port 30USB. After the input signals are subjected to clock and data recovery, the serial data is deserialized by a serializer/deserializer (SerDes) circuit 75, frames are detected, and parallel data (e.g., in the form of 32-bit DWords) is communicated to a routing multiplexer 80. Depending on the number of desired PCIe ports, the data from SerDes 75 is distributed to one or more than one of the four PCIe adapters 55. Once the multiplexer's routing configuration is set, it remains static until the router or the host computer output format is reconfigured. The incoming data is handled by the ingress circuitry in the selected adapter(s) as discussed above.

Consider next, DisplayPort data incoming to DP port 30DP. The data, which includes a video stream, is subjected to clock and data recovery, and the serial data is deserialized by a SerDes circuit 85. The data is then routed to the decoding portion of a DP decoder/encoder 90, which decodes (interprets) the DP stream, creates a logical representation of the data being carried over the DP interface, and packages the representation into PCIe Vendor Defined Messages (VDMs).

These VDMs are then sent to PCIe adapter 65a. A buffer 95 is interposed between the DP decoder and the adapter, and stores up to three scan lines worth of data to accommodate possible temporary congestion in the network. The data is transferred to the FIFO registers of PCIe adapter 65a, which sends the request to the bus. The egress circuitry for the port that is able to accept the request queues the request, and handles the request as discussed above.

Consider next, DisplayPort auxiliary channel data incoming to auxiliary DP port 30DP*. Write data is stored in DisplayPort registers 100 and the contents communicated to PCIe adapter 65b, which sends the request to the bus. The egress circuitry for the port is able to accept the request queues the request, and handles the request as discussed above. The accepting CIO port is the same port that is configured to accept DisplayPort stream packets since the video stream channel and the auxiliary channel are destined for the same endpoint. The DisplayPort auxiliary channel is bidirectional, and the DisplayPort registers can also store display identification data that the connected display provides to allow the host to determine the display's capabilities.

Also coupled to bus 40 through respective PCIe 105a and adapters 105b, but not associated with any specific port, are a general DMA unit 110 and an isochronous DMA unit 115. The general DMA controller sets up DMA transfers when commanded to do so, while the isochronous DMA controller only does so at specified times. The router also includes a message processing adapter 120 and a peer management adapter 122. The message processing adapter (sometimes referred to as the message processing unit or "MPU") supports the generation of VDMs that are used for DP transport, peer-to-peer communications, and time base management as will be discussed below. The peer management adapter (sometimes referred to as the peer manager unit or "PMU") supports the peer-to-peer functionality that was mentioned briefly above and will be described in greater detail below.

One feature of the router is that it can participate in an orchestrated series of exchanges with other routers in the network to maintain a common time reference. This is supported by a transport time base manager or time manager unit ("TMU") 125. While TMU 125 is shown as a single block coupled to the bus through a PCIe adapter 130, it cooperates with circuitry in CIO adapters 60, which is shown schematically as a line going to the CIO adapters. The mechanisms for providing a common time reference are the subject of the above-referenced concurrently filed U.S. patent application titled "Converged Computer I/O System." At this point it suffices to note that the TMU operates to generate and receive synchronization messages (implemented as VDMs) that are sent between linked CIO ports. In a representative embodiment of the present invention, these messages are sent at intervals on the order of 10 µs. One of the routers is designated the TimeMaster and transmits messages containing its clock count that are relayed to all the other routers. Additionally, messages are sent between linked ports to allow each port to lock its frequency and phase to that of the TimeMaster.

Regardless of its format when it entered the router, data transferred across the bus for egress has the logical form of PCIe packets. Incoming PCIe traffic remains PCIe traffic (e.g., standard messages being used for information that originates within a CPU producer/consumer model representing reads and writes to memory space, I/O space, or configuration space). VDMs are used to transport information outside the CPU producer/consumer model. This includes native I/O that is transported across the CIO fabric (such as the Display- Port example discussed above). It also includes the synchronization messages under control of TMU 125 mentioned above.

Parallel PCIe packet data leaving the egress circuitry of CIO adapters 60 is serialized by respective SerDes circuits 135, which are labeled "Optical SerDes" to signify that they are higher speed devices to support the higher bit rates of data transported on the optical CIO links. The data from each of the optical SerDes circuits 135 is communicated to the electrical-to-optical portion of a respective electrical/optical translation unit 50. The serial data is then carried over the optical link to the next router. Parallel PCIe packet data leaving the egress circuitry of PCIe adapter 65c is converted to USB format by USB controller 70 and output on USB port 30USB.

The above discussion was directed primarily to data entering the upstream-facing ports and being routed to one of the downstream-facing ports. The discussion applies substantially symmetrically to the case of data entering one of the downstream-facing ports. One case worth noting is that of the DisplayPort data that was described above. Once the DP data has traveled to its destination upstream-facing CIO port, it is routed so as to exit a downstream-facing DP port. Thus while the DisplayPort video stream channel is unidirectional, the routers preferably provide bidirectional circuitry (adapters, SerDes circuits, DP encode/decode circuit). This is so that the same design of router can handle the transformation of the VDMs carrying the DP video stream back to a format that the endpoint device (i.e., a display or other consumer of a DisplayPort stream) can accept.

Consider next, this reverse process, which is recreating the DisplayPort stream from the DisplayPort data VDMs that were output by the router as described above. The VDMs presented to bus 40 by one of CIO adapters 60 are communicated to PCIe adapter 65a and the encoding portion of DP decoder/encoder 90, which decode the VDMs and encode the data into the desired DisplayPort stream for output at DP port 30DP through SerDes circuit 85. DisplayPort time base circuitry 140 cooperates with TMU 125 to restore the timing information that was present in the DisplayPort stream when it was entered the first router's input DP port. As mentioned above, TMU 125 provides a common time base over the network of routers.

As mentioned above, peer-to-peer connections are not supported by standard PCIe addressing. That is, PCIe, like PCI, does not support inter computer bridging. The CIO architecture according to embodiments of the present invention provides extensions to the standard PCIe switch architecture that allow communications to cross domain boundaries. While the vast majority of intra-domain traffic is carried using standard PCIe memory conventions (i.e., Memory Write/Read), inter-domain transfers are handled by the use of an alternate PCIe transfer type. This transfer type is the PCIe Vendor-Defined Message ("VDM").

In general, the topology of a CIO network that supports peer-to-peer communications is a superset of the topology experience with a PCIe network. A number of general features for the configuration of a CIO network are:
1. PCIe based transactions.
2. Plug and play configuration (i.e., configuration is accomplished without end user intervention).
3. Removal of a device has limited or no effect on remaining devices.
4. Peer-to-peer transactions behave the same as non peer-to-peer operations.

A domain is defined as a PCIe hierarchy with a single PCIe Root Element (Port or Complex). A domain typically also includes a set of CIO routers and endpoints (EPs) connected to the root element. A domain can only be configured by the computer connected to the root element. Root router 10R is an example of a root element.

A domain is characterized by a domain number, which is derived from the PCIe address field. The upper 8 bits of the PCIe's 64-bit address field are used to define a domain number. A total of 256 ($2^8$) domains can be supported. The remaining 56 bits of the address field are used for the target address, and defines the number of bytes addressable within a domain ($2^{56}$). The domain number of a local network is zero (0) by definition. This allows 32-bit addressing to be used for many if not most of the transactions within the domain.

Domain numbers are only valid within a given domain. Each domain has its own set of domain numbers. Thus, except for domain number 0, domain numbers are virtual. This construct allows for a domain to be removed from the system without the remaining domains being affected. Domain numbers are assigned as new domains are detected.

The host refers to the domain where a message originates. In most implementations, the entity generating the message is the computer connected to the root element, which is also referred to as the host computer.

A peer-to-peer communication is defined to be a communication from a source in one domain to a target in another domain. The purpose of peer-to-peer traffic is for one domain to transfer a combination of either commands and/or data to another domain. In preferred embodiments of the present invention, a transaction is able to traverse the network between the operation's originator and the target without help (e.g., without requiring the host computers of the intermediate domains to participate once discovery and configuration have occurred).

A vendor-defined message (VDM) is a PCIe defined transaction allowing information to be transferred by means not defined by other mechanisms. The detailed definition can be found in Section 2.2.8.6 of the PCIe specification. VDMs are defined by the PCIe specification as being a Posted Class transaction. The class also includes Memory Write operations. As such, VDMs and Memory Writes have the same characteristics with regard to transfers within the CIO network.

An alien domain is a domain on the opposite side of a peer-to-peer connection relative to a host.

A target is the PCI entity in a domain where the message is to be received.

A hot plug event occurs when a change of state on a CIO port has been detected while the domain is active. The change of state can be either the connecting of two CIO ports or the disconnect of the ports.

As discussed above, CIO routers preferably take the form of a PCIe switch, with modifications to support additional functionality, including peer-to-peer connections. One difference mentioned above is that the preferred CIO transport mechanism is optical rather than electrical. However, the present discussion will address differences in the port (adapter) design. As mentioned above, each adapter includes a PCIe switch, which is provided additional functionality. The design of the switch is symmetric. The same device can be used at either end of a CIO link. The upward facing port is either a PCIe or CIO port. Only one port can be defined as being upward facing.

Further, in embodiments where the PCIe switches on which the CIO routers are based do not contain a processor, the peer discovery and configuration occur under the direction of the host computers in the affected domains, supported by logic built into the routers. The preferred routers are symmetric so that one design of the router chip can be deployed system wide if desired. However, it should be realized that once a router is configured at startup, the upstream-facing port and the downstream-facing ports behave differently in a number of respects.

Two numbering schemes come into play during configuration, PCIe-based bus enumeration and CIO's unique domain numbering scheme. Domains are self contained systems, with each domain including a host and a CIO network. The concept of a domain number is used to allow domains to be interconnected for peer-to-peer operations. Each domain has a set of domain numbers only valid within the domain. As part of the network configuration, each domain assigns domain numbers for the other domains. These numbers are virtual within a domain.

While a Memory Write could be used to perform the same task as a VDM, VDMs have several advantages over Memory Write operations. For example, VDMs allow for the creation of CIO-centric functions/messages in a flexible manner. By using the VDM Type 1 format for CIO traffic, messages targeting resources not capable of processing the request will discard the message silently. The format of a VDM has two components used in the message definition:

1. The first component is a 16-bit Vendor Number. This number is the PCI-SIG value assigned to the company defining the message. In the case of Apple Inc., the value is 0x106B.
2. The second component is a 32-bit field to be used as the vendor chooses. With such a large field, message/commands/requests for CIO operations can easily be accommodated with room for future growth.

Additionally, VDMs allow for CIO-related operations to have a minimum footprint on the memory map of the system. By using the "Route by ID" form of the message, several advantages are available:

1. ID routing allows for a more compact transaction. Both the target and operation being request is contained with the same header.
2. Targets of transaction do not occupy memory space within the system.
3. Messages do not have to contain data.
4. Since no address is included with the message, for large data transfers (e.g., DisplayPort) a FIFO model of operation is possible without violating the spirit of the PCIe concept of ascending addresses for burst transfers.
5. Limits inter-domain transactions to a single hop (explained below).

Currently VDMs have three usages defined with a CIO network.

1. Configuration messages are used for inter-domain configuration and management.
2. Time base messages are used by a CIO time base entity to cause time base entities in other CIO routers to remain in sync.
3. Peer-to-peer messages are used to send traffic between peers.

For message targeting a resource within a domain, no special action is required by the CIO router. ID based routing allows any resource within a domain to be accessed. Detain discussion of the usage for each message is outside the scope of this document. The Inter-domain Configuration usage, however, will be discussed in a limited fashion as an example of VDM routing.

Figure 3:
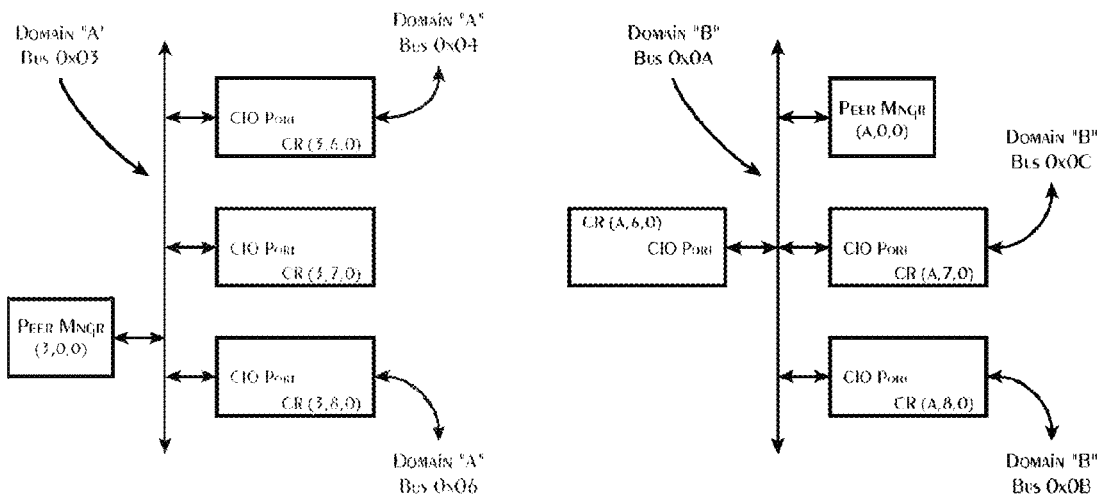
FIG. 3 shows an example of routers in two domains.

For a message to be forwarded to an alien domain, the router must forward the message to the port connected to the alien domain. This determination is accomplished by using the bus number and device field of the host port. The given example is shown in FIG. 3, which shows two CIO Routers. Each router is part of a unique domain. Within each router are three CIO Ports and a Peer Management resource. Two of the CIO Ports are being used for intra-domain transactions. The third port will be used for used for a domain-to-domain connection and is the subject of the example.

Figure 4:
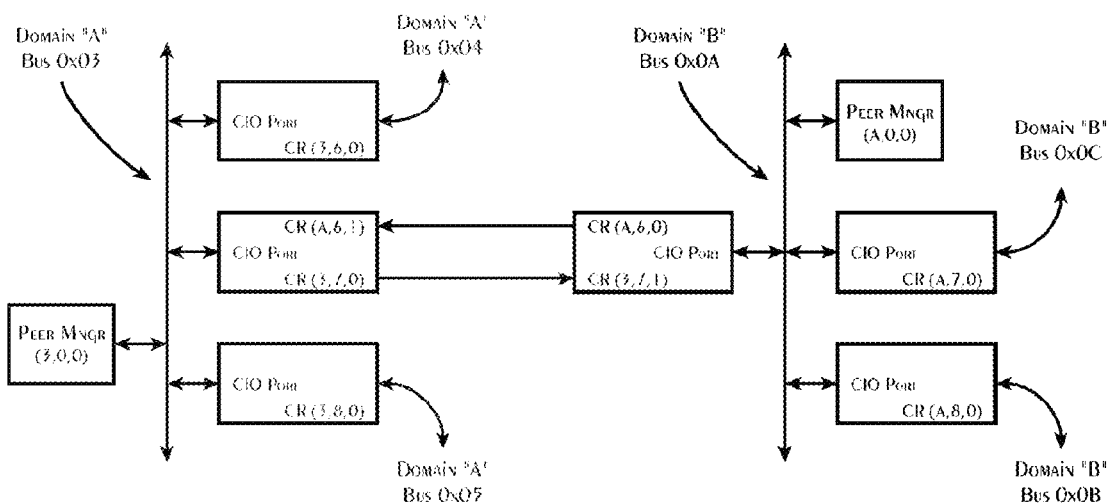
FIG. 4 shows the state after the domain-to-domain connection has been made.

FIG. 4 shows the state after the domain-to-domain connection has been made. Software within each domain was notified of a Hot Plug Event and has determined a domain-to-domain connection has been made. This determination is based on configuration software examining the configuration space accessible from the host port.

Normally, a CIO port is a single function device. When a peer port is attached, the port now appears to have two functions. To software, the bridge appears as the primary function connected to the router's secondary bus (Bus: X, Device: Y, Fnc: 0). The newly attached device will appear to be a secondary function (Bus: X, Device: Y, Fnc: 1). The newly attached device is in reality the alien domain's Port.

The use of secondary function numbers for accessing low level resources enforces a peer protection mechanism. A Host is not allowed to run Configuration Cycles on an alien domain. This restriction protects the alien domain's resources from being reassigned. In addition, the host does not assign a new bus number within its own network.

Messages to the alien domain are restricted to a number of devices directly connected to the peer CIO router's secondary bus. Since two of the possible Function values are used by the local CIO port and the peer CIO port, six values remain. The Ingress port of the alien domain's CIO port has the responsibility to convert VDM with these six function values into a format containing Device and Function numbers for the target CIO router. The translation is:

| Host (Bus, Dev, Fnc) | | Peer (Bus, Dev, Fnc) |
|---|---|---|
| (X, Y, 2) | → | (Z, 0, 0) |
| (X, Y, 3) | → | (Z, 1, 0) |
| (X, Y, 4) | → | (Z, 2, 0) |
| (X, Y, 5) | → | (Z, 3, 0) |
| (X, Y, 6) | → | (Z, 4, 0) |
| (X, Y, 7) | → | (Z, 5, 0) |

To make possible peer-to-peer configuration, resources needed in the configuration process must have fixed locations. When a peer-to-peer connection detected, a Host system has to start communicating needs to its peer. A standardized method of communicating to fixed resources must be used for this initial communication. Since domain numbers have not been established, the only method of routing information of more than a single DWord to the opposite domain is via messages.

Each CIO router has a peer manager unit (PMU), which has the ability to receive and create VDMs used in the peer-to-peer configuration process. The PMU is always located at Device 0, Function 0 of its router's secondary bus.

Figure 5:
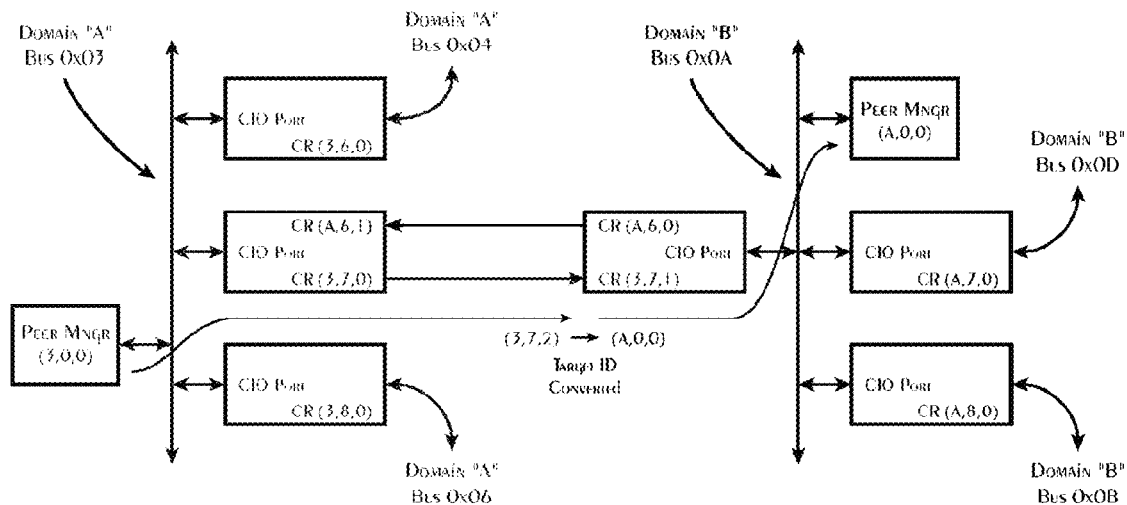
FIG. 5 shows a message being generated by the PMU in domain A.

With the PMU located at a fixed location, a host has the ability to send messages targeting the alien domain's PMU to start the configuration. FIG. 5 shows a message being generated by the PMU in domain A.

In this example, domain A's PMU is sending a message to domain B's PMU. The peer-to-peer connection has already been made. Configuration software on domain A know ID device 3, 7, 0 is connected to a alien domain. The software also knows due to the fixed resource requirements, the alien domain's PMU is located at ID value X, 0, 0. The following actions occur:
1. Domain A's PMU issues a VDM with the Target ID value of 3, 7, 2.
2. The message is accepted by the CIO Port 3, 7, 0 Egress Port and forwarded over the link.
3. When the message is received by the alien domain Ingress Port (A, 6, 0), the Target ID value is translated to A, 0, 0.
4. The message is placed on the alien CIO router's secondary bus and is accepted by the local PMU.
5. The message is processed. The message captured by the alien PMU contains the Request ID A, 6, 0. Software on the alien will use this value if a response message is needed.

As mentioned, a CIO router must have some fixed resources accessible from an alien domain. These assignments are:

| | |
|---|---|
| X, 0, 0 | Peer manager unit (PMU) |
| X, 1, 0 | Time management unit (TMU) |
| X, 2, 0 | Message processing unit (MPU) |
| X, 3, 0 | Undefined |
| X, 4, 0 | Undefined |
| X, 5, 0 | Undefined |

Figure 6:
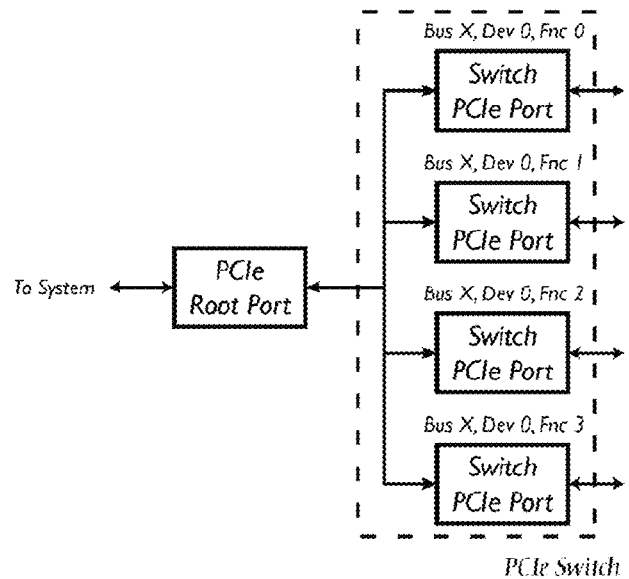
FIG. 6 shows how software views the structure of a PCIe switch.

PCIe switches tend to be multi-function devices. When viewed from the Root Port, such switches presents each down stream port as being connected to the Root Port's bus directly. FIG. 6 shows how software views this structure.

Figure 7:
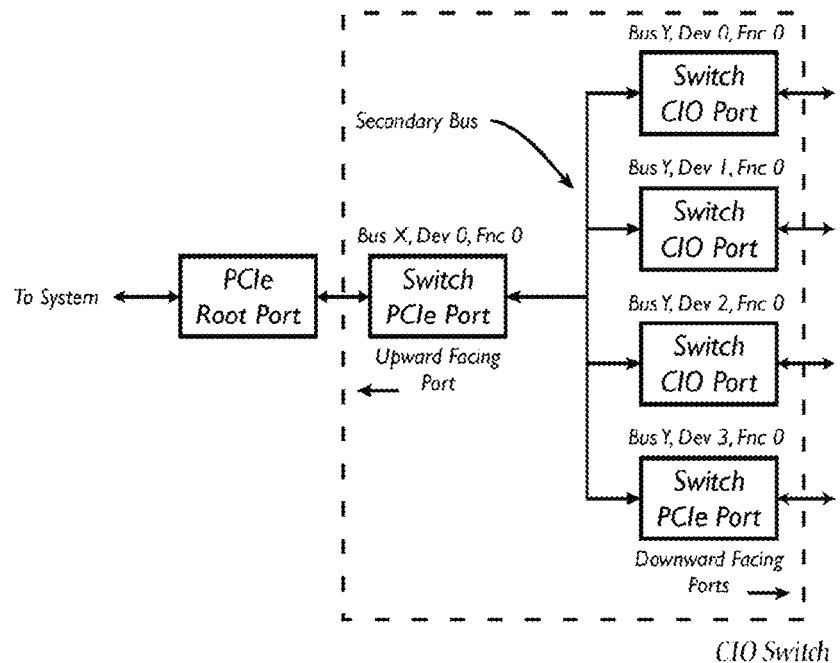
FIG. 7 shows how software views the structure of a PCIe switch with a secondary bus.

A CIO switch represents a single bridge device to the Root Port. When viewed from the Root Port, behind the upward facing bridge is a secondary bus where the down steam ports reside. FIG. 7 shows how software views this structure.

This secondary bus approach has several advantages. The concept of peer-to-peer traffic is directly supported. Traffic is only forwarded on a bus capable of having the data accepted. This concept will be developed later in the document. A chip has only one upward facing port. A mixture of different functions can be created to attach to the internal interconnect. Beside switch ports, these PCIe entities provide functions such as DisplayPort transport, Time Base management, DMA resources and the like. The diagram above shows a total of 4 downward facing ports. Three ports are CIO capable, and one port is PCIe capable.

At first observation, a switch with a secondary bus architecture seems to add latency to the transport of TLPs. This architecture is a statement of both a programming model and routing resources, not storage. The architecture should not increase latency Each switch port can be thought as having two channels. These channels are the Egress Channel and Ingress Channel. The egress channel is used to accept outgoing traffic to be forwarded out of the device. Thus, a port's egress channel always transfers data from the switch's secondary bus. The ingress channel is the reverse of the egress channel. Traffic is placed on the switch's secondary bus by a port's ingress channel. Thus, for a switch port, the egress channel moves data from the switch's secondary bus to the external world. The ingress channel moves data from the external world to the secondary bus. Also, PCIe entities beside switch ports have egress and ingress channels. For this class of device the transfer target is internal to the unit.

A Switch PCIe Port differs from a Switch CIO Port is two different aspects. The first difference is the medium used to transport information away from the port. For a PCIe port, the medium is electrical. The CIO port's medium of choice is optical fiber. This difference is not a first order concern to system software. The second difference is a CIO port has extensions to support peer-to-peer traffic where as a PCIe port does not. A peer-to-peer operation occurs when traffic from one domain is transferred to another domain. Thus, a PCIe port only transports intra-domain traffic while a CIO port can carry intra-domain and/or inter-domain traffic.

Figure 8:
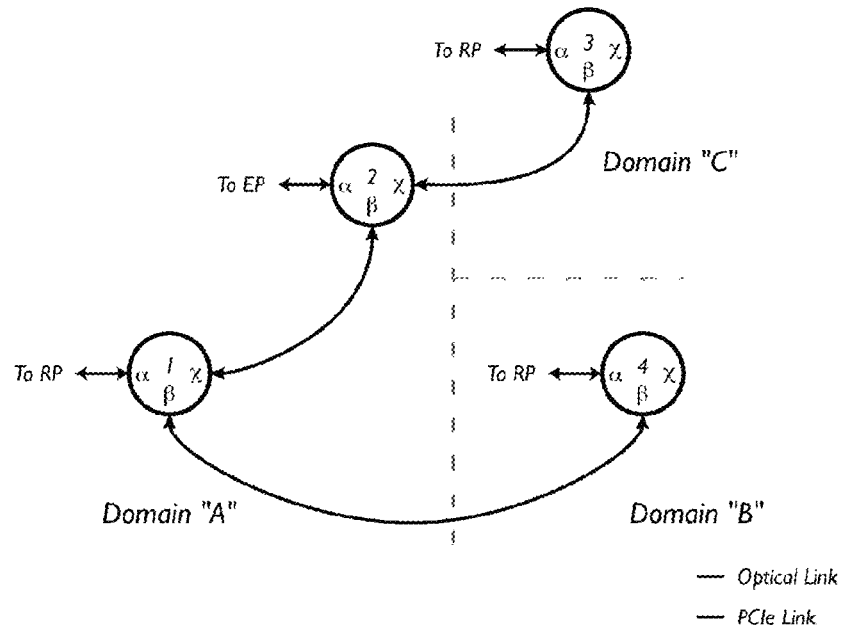
FIG. 8 shows a three-domain system.

FIG. 8 shows a three-domain system with domain A having two CIO switches, each switch having three ports. Port α of the switch is a PCIe port. Ports β and χ are CIO ports. The connection within domain A between switch 1 and 2 illustrates CIO ports carry both intra and inter-domain traffic. Domain A's RP has access to the EP connected to switch 2. Such traffic from domain A's RP is an example of intra-domain operation for the β and χ port pair. At the same time, β and χ pair is able to transport packets from domain B targeting domain C.

PCIe does not support the ability for one computer system (domain) to be connected to another system (domain). CIO introduce this functionality. With this additional ability, the need to extend the PCIe switch model arises. Additional abilities need to be added both ingress and egress channels of a CIO port. Most of the additions are represented by new Configuration Space visible resources. Other functions are not visible to software. Such functions are needed to maintain the PCIe transaction rules for operations crossing between domains.

The egress channel of a PCIe/CIO port makes use of two set of address range registers pairs. These register pairs are the Memory Base/Memory Limit Registers and Prefetchable Memory Base/Prefetchable Memory Limit Registers (The concept of prefetching makes little sense for PCIe.) For a downward facing port, these register pairs define two address regions behind the port. The port is to accept transactions targeting these regions and forward the operation downstream. (The upward facing port uses the same register in an inverse sense. Transactions not within the range of the registers are accepted for forwarding.)

The Memory Base/Memory Limit Register pair only reference the lower 32 bits of the PCIe address space. The Prefetchable Memory Base/Prefetchable Memory Limit Register pair are 64 bits wide and can reference the entire PCIe address space. As described in the white paper detailing the CIO network configuration, the upper 8 bits of the PCIe address field are re-purposed to hold domain numbers. All intra-domain transfers have a domain value of 0x00. Thus, intra-domain traffic is non peer-to-peer. The Prefetchable Memory Base/Prefetchable Memory Limit Register pair must have the upper 8 bits to be hardwired to zero. This modification is required to keep inter-domains traffic from being accepted by a non peer-to-peer ports (PCIe ports).

A Switch CIO Port's egress channel has an additional logic to accept transaction with domain number other than zero. Both sets of address range register pairs defined a contiguous range of address. Due to the fact CIO ports supports hot plugging and domain can be added at different times on different ports, the set of domains behind a given CIO port's egress channel may be non contiguous. The Valid domains Block of a CIO port contains a list of domains behind the port. If a transaction has a domain number matching an entry in the block, the transaction is accepted and forwarded. The Valid domains Block control is within the port's configuration space. The block must be able to maintain a list containing the maximum number of domains for a system. Note, the list will never contain the value of 0x00. The value 0x00 is handled by either the Memory Base/Limit or the Prefetchable Memory Base/Memory Limit register pairs if needed. The definition of the block or its configuration register image is outside the scope of this document.

Figure 9:
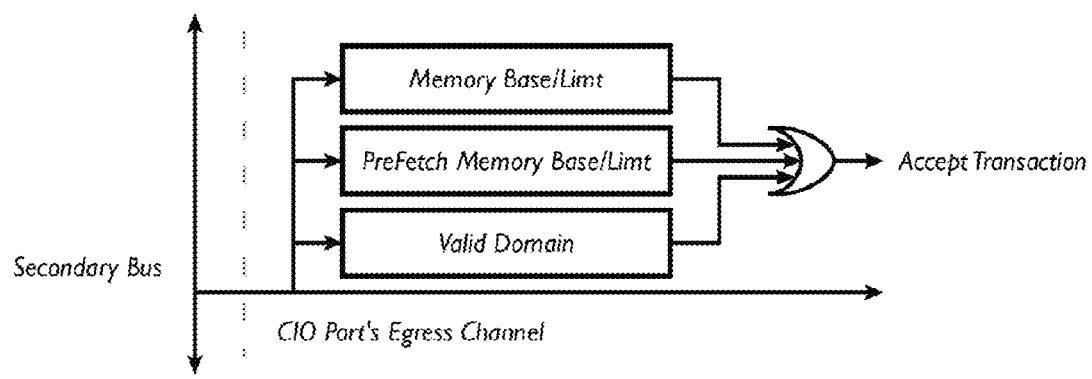
FIG. 9 shows a general overview of the transaction acceptance block for a CIO port.

FIG. 9 shows a general overview of the transaction acceptance block for a CIO port. The ingress channel for a CIO port also has unique requirements. Whereas the new requirements for the egress port are needed at every connection portal, the ingress new functions are only used for portals connected to a peer. Using the diagram above showing domain A, B, and C, the port pairs β and β, between domain A and B, and port pairs χ and β, between domain A and C are peer-to-peer connections. The port pairs β and χ, within domain A is not a peer connection.

Each domain uses a virtual map to reference resources within the domains. The mapping of one domain will be different for any other domain. The CIO port's ingress channel making a peer connection has the responsibility to handle the domains translation from the remote peer to the local domain domains mapping.

The translation unit performs two operation on an incoming request before the request is presented within the domain. The first action is to translate the peer's domains number into the local domain version of the number. This action is accomplished by referring to a translation RAM within the port's ingress channel. This RAM contains the mapping for every domains number capable of being seen by the port. This action is taken on the domains number contained in either a Memory Read or Write request. Access to the translation RAM is via the port's configuration space.

Figure 10:
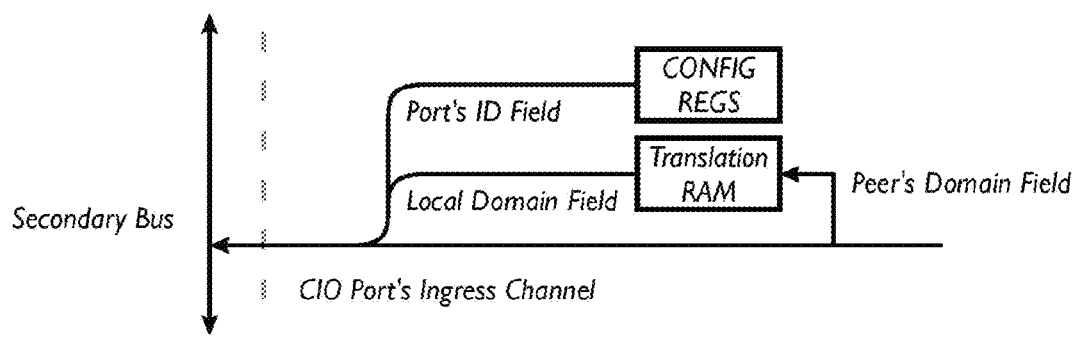
FIG. 10 shows how to convert the request's Request ID number to the Request ID as if the port had issued the request.

The second action is to convert the request's Request ID number to the Request ID as if the port had issued the request. This operation is a simple substitution of the Bus, Device, Function fields from the port's configuration space. This is shown schematically in FIG. 10.

Additional actions are required to support Read Requests. These actions affect both the Ingress and Egress channels. Once again, the additional actions are related to read transactions only and only concern the switch port connected to a peer. These functions are described below in connection with memory reads.

Vendor Defined Messages are routed using the target's ID value. Since when a peer-to-peer connection is made all the bus numbers for a Peer may have been assigned, the Configuration Register of the opposite Peer can not be placed a new bus. To get around this problem, the new configuration space appears as a secondary function to the port's configuration space. Thus, when a Hot Plug event is detected, the configuration software will probe and will only detect a secondary function to the port. To software the port's configuration space is Bridge Port (Bus X, Dev Y, Fnc 0) and the Peer's Port (Bus X, Dev Y, Fnc 1). Any further probing will result in Unsupported Request (UR) being returned.

Since Bus Number, Device Number, and two of the Function Numbers are already allotted, the domain's system has a very limited view into its peer space. Only six function numbers are available for message transport (2-7). This limits the accesses made by one domain to another domain to only six entities within the CIO router where the connection has been made.

Like both the Memory Write and Read transactions, a CIO Port's Ingress channel must perform a translation on a message's target ID value. The target ID will have the secondary bus number of the router where the message was issued. The device number will be of the Port accepting the message. The Ingress channel must substitute its Bus number for the originators number. The originator's device number is dropped.

The new device number is based on the target's function number. The new target's device value is found be taking the original function number and subtracting 2. This will yield a value between 0 and 5 inclusive. The new function number is always 0.

Figure 11:
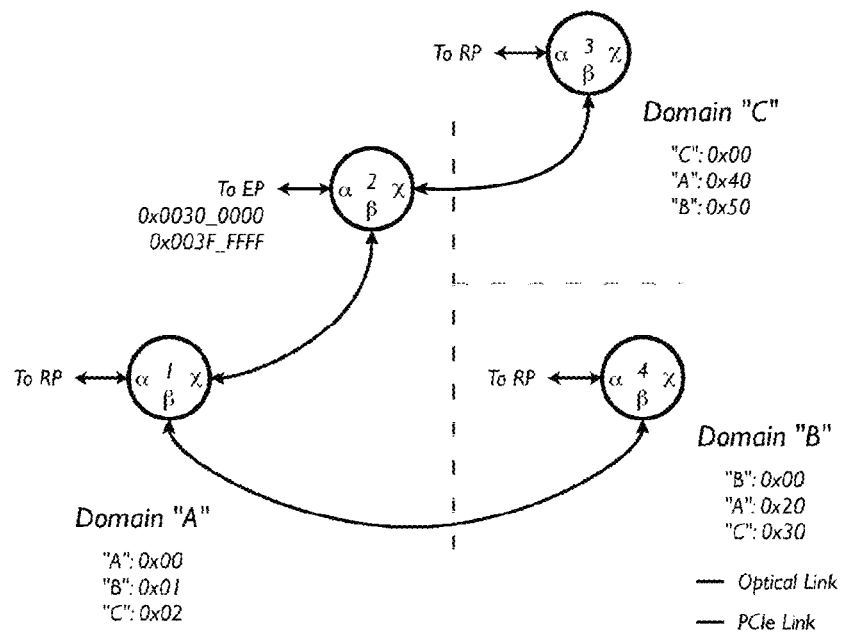
FIG. 11 shows a system with three domains connected.

FIG. 11 shows a system with three domains connected. This figure will be used to explain several examples of different type of TLPs traversing the illustrated network. The following tables describes how each port in the example is configured.

The table below shows how Domain A's ports are configured. MemSpc is equal to the address range 0x30_0000 through 0x3F_FFFF behind domain A's Switch 2 port α.

| | | Domain A | | |
|---|---|---|---|---|
| Switch 1 | Port α | Port β | | Port χ |
| | Ingress | Ingress domain #20 > 00 domain #30 > 02 | | Ingress |
| | Egress ≠ MemSpc | Egress domain #01 | | Egress domain #02 MemSpc |
| Switch 2 | Port α | Port β | | Port χ |
| | Ingress | Ingress | | Ingress domain #40 > 00 domain #50 > 01 |
| | Egress MemSpc | Egress domain #01 ≠ MemSpc | | Egress domain #02 |

The table below shows how Domain B's ports are configured.

| | | Domain B | |
|---|---|---|---|
| Switch 4 | Port α | Port β | Port χ |
| | Ingress | Ingress domain #1 > 00 | Ingress |
| | Egress | Egress domain #20 domain #30 | Egress |

The table below shows how Domain C's ports are configured.

| | | Domain C | |
|---|---|---|---|
| Switch 3 | Port α | Port β | Port χ |
| | Ingress | Ingress domain #2 > 00 | Ingress |
| | Egress | Egress domain #40 domain #50 | Egress |

Assume domain B is to write some data at the location 0x0032_1234 in domain A. The unit within "B" desiring to execute the transaction posts a write request with the address 0x2000_0000_0032_1234. The following sequence then occurs within the network:

1. Switch 4's port β recognizes the write transaction as being for a domain behind the port. The port's egress channel then accepts the transaction and forwards the request to its peer.

2. Switch 1's port β receives the request. Since request is being received on the port's ingress channel and the channel is connected to a peer, the address field (along with the Requester ID field) is translated. The new target address is 0x0000_0000_0032_1234.
3. The translated request is presented to the secondary bus of the switch. Switch 1's port χ recognizes the transaction's target as being behind the port. The transaction is accepted and forwarded.
4. Switch 2's port β receives the request. Since request is being received on a port not connected to a peer, no translation is performed on the request.
5. The request is accepted by Switch 2's port α and forwarded.

Figure 12:
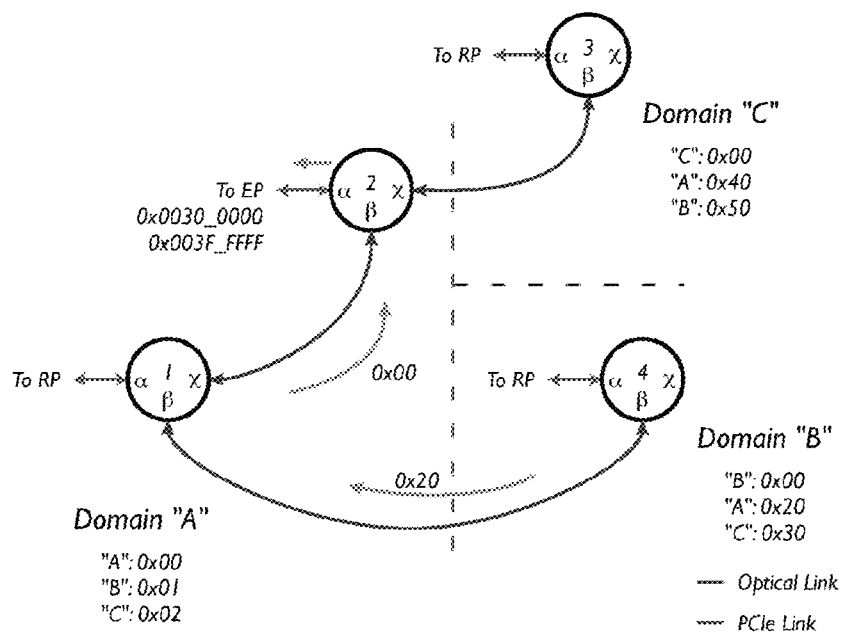
FIG. 12 tracks the path of the request and the value of the domain's number.

FIG. 12 tracks the path of the request and the value of the domain's number. Assume domain B is to write some data at the location 0x0032_1234 in domain C. The unit within "B" desiring to execute the transaction posts a write request with the address 0x3000_0000_0032_1234. The following sequence then occurs within the network:

1. Switch 4's port β recognizes the write transaction as being for a domain behind the port. The port's egress channel accepts the transaction and forwards the request to its peer.
2. Switch 1's port β receives the request. Since the request is being received on the port's ingress channel and the channel is connected to a peer, the address field (along with the Requester ID field) is translated. The new target address is 0x0200_0000_0032_1234.
3. The translated request is presented to the secondary bus of the switch. Switch 1's port χ recognizes the transaction's target as being behind the port. The transaction is accepted and forwarded.
4. Switch 2's port β receives the request. Since request is being received on a port not connected to a peer, no translation is performed on the request.
5. The request is accepted by Switch 2's port χ and forwarded.
6. Switch 3's port β receives the request. Since request is being received on port's ingress channel and the channel is connected to a peer, the address field (along with the Requester ID field) is translated. The new target address is 0x0000_0000_0032_1234.
7. The translated request is presented to the secondary bus of the switch. Switch 3's port α recognizes the write transaction as being behind the port. The transaction is accepted and forwarded.

Figure 13:
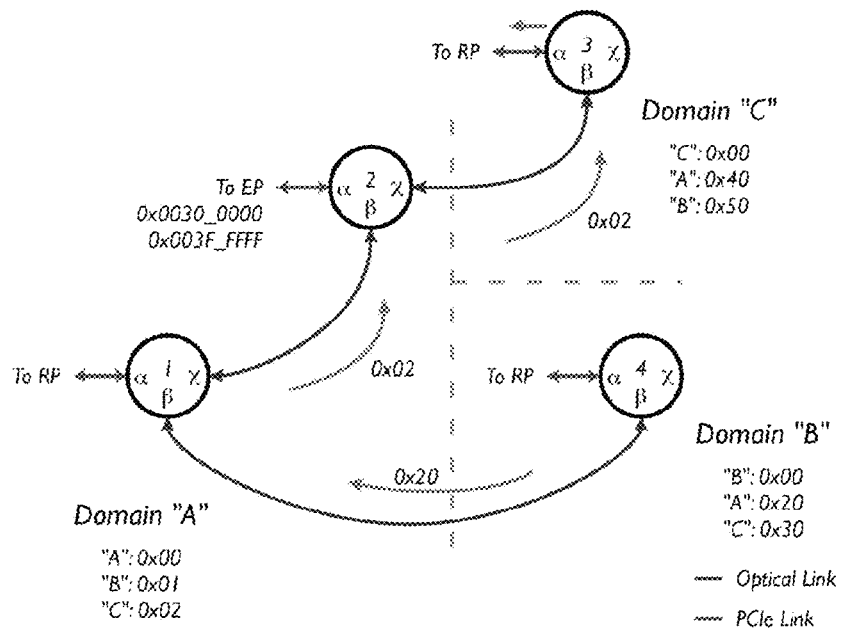
FIG. 13 further tracks the path of the request and the value of the domain's number.

FIG. 13 tracks the path of the request and the value of the domains number.

Read transactions add an extra level of complexity to the operation of peer-to-peer traffic. Unlike write transactions, read requests are non-posted. Non-posted transactions are completed in two phases. The first phase is same as for a posted operation (e.g., memory write) in the sense a request with an address must be delivered to the target. As such the process used for a posted operations is the same for a non-posted request.

Where posted and non-posted operations differ is the returning completion required by a non-posted request. A posted operation has a one way trip through the network from requester and target. A non-posted operation has the same trip to the target but adds the trip back to the requester with completion data. To support the return transport of the completion data, additional actions are taken by a switch port connected to a peer.

PCIe completion TLPs are returned to the transaction's requester by using the Requester ID value embedded in the original request. Within a given domain, this method still is valid. An issue appears when request crosses to another peer. A device having a unique Requester ID across two or more domains cannot be assumed. (In fact, the configuration of peer-to-peer operation does nothing to assign bus numbers within a domain.) ID are only unique within a domain.

To solve the problem, when the address translation takes place in the port's ingress channel, the newly formed request has the ID of the ingress port. This action causes the switch port receiving the traffic from its peer to appear to be the originator of the traffic. Two additional actions are required by the switch port receiving non-posted transactions from a peer. These actions are management of request tags and original Requester IDs.

Figure 14:
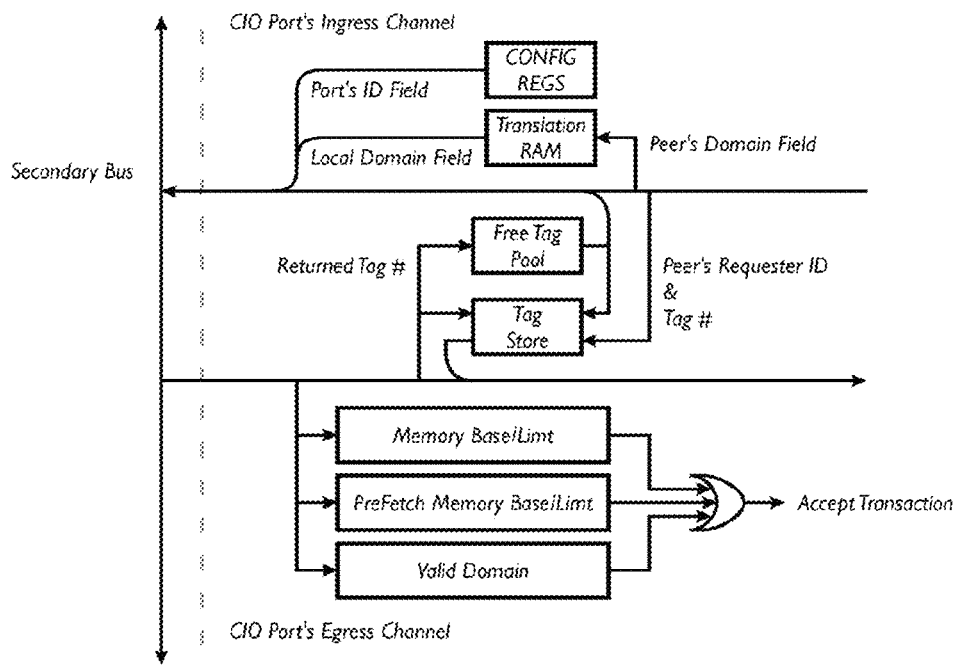
FIG. 14 shows the additions to a switch port to support a memory read example.

FIG. 14 shows the additions to a switch port to support these actions. If more than one device in a domain makes non-posted requests to resources in a second domain at the same time, the request tags used by the two requesters may be the same. On the target domain, these tags must be unique. To insure this, the ingress port where the address translation is done must substitute the request's tag value with a number for a local pool of values. The Request ID and tag number of the original request are saved in a request store. When the request is presented to the secondary bus within the switch, the switch port handling the TLP will appear to the requester of the operation. Since the port is a unique entity within the domain and the tag value is unique within the port, the request is unique within the domain.

When the target returns a completion for the request, the completion is sent to the switch port which received the original request from its peer. The port uses the tag value in the completion to refer to the store containing the active request of the port. The store supplies the Requester ID and tag of the original request. These values are substituted into the completion and the completion is forwarded to the peer.

If the completion from the target contains the last byte of the request, then switch port's tag is returned to the port's free tag pool. Also, since the store used by the port to hold original Request ID and tag numbers has a finite size, the management of flow control is a little different from a normal switch. Normally, a port returns a flow control credit back to the requester once the request has been forwarded out of a port. This action is done by all CIO port for all transactions except for an Inbound non-posted request coming from a peer. The flow control credit is only returned after the completion is returned to the request originator. The flow control credit is returned at the same time as the port's tag pool is updated.

Figure 15:
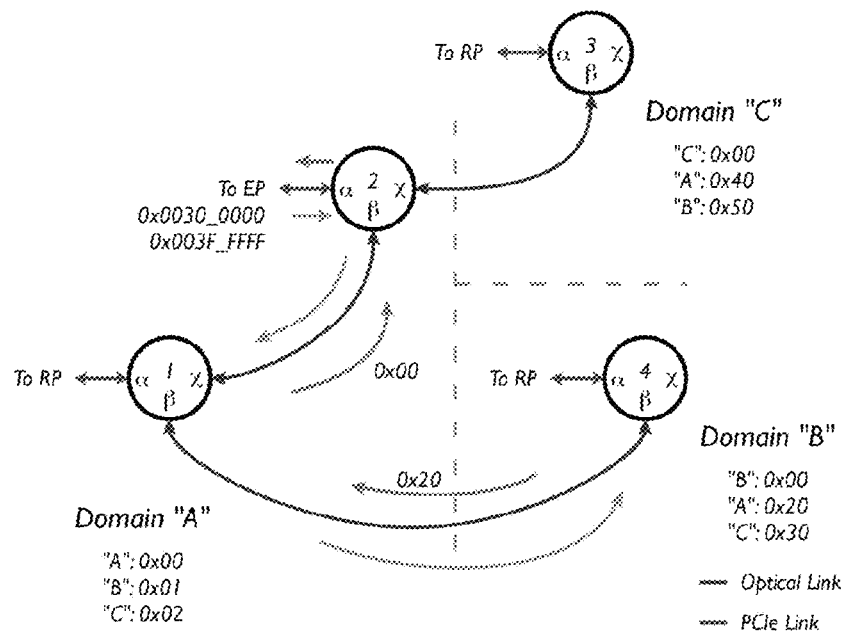
FIG. 15 shows a sequence of actions in connection with a memory read.

Assume domain B is to read some data at the location 0x0032_1234 in domain A. The unit within domain B desiring to execute the transaction issues a read request with the address 0x2000_0000_0032_1234. The following sequence, shown in FIG. 15, then occurs within network:

1. Switch 4's port β recognizes the request as being for a domain behind the port. The port's egress channel accepts the transaction and forwards the request to its peer.
2. Switch 1's port β receives the request. Since the request is being received on the port's ingress channel and the channel is connected to a peer, the address field (along with the Requester ID field) is translated. The new target address is 0x0000_0000_0032_1234. Since the operations is a read, a tag value from the port's free tag pool is selected. This tag value is used to store the request's Requester ID and tag number into port's Active Non-Posted Transaction Store. The local tag value is inserted into the request along with the new address value and Request ID.

3. The translated request is presented to the secondary bus of the switch. Switch 1's port χ recognizes the transaction's target as being behind the port. The transaction is accepted and forwarded.
4. Switch 2's port β receives the request. Since request is being received on a port not connected to a peer, no translation is performed on the request.
5. The request is accepted by Switch 2's port α and forwarded.
6. The target of the request returns the completion.
7. Switch 2's port β recognizes the Requester ID value as being behind the port. The completion is accepted and forwarded.
8. Switch 1's port β recognizes the Requester ID value as being the destination for the completion and accept the completion. Since the port is connected to a peer, the tag within the completion is used to reference the port's Active Non-Posted Transaction Store. The Requester ID and tag from the original request is substituted into the completion packet and forwarded. If the transaction completes the request, the port's free tag pool is updated and a non-posted flow control update is issued.
9. Switch 4's port β forwards the completion to the originator of the request.

Figure 16:
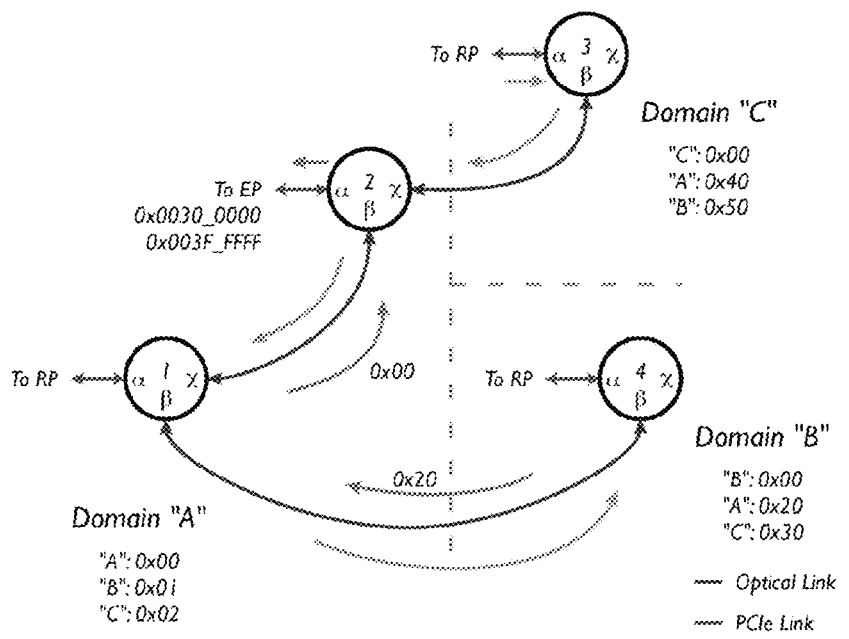
FIG. 16 shows an additional sequence of actions in connection with a memory read.

Assume domain B is to read some data at the location 0x0032_1234 in domain C. The unit within "B" desiring to execute the transaction issues a read request with the address 0x3000_0000_0032_1234. The following sequence, shown in FIG. 16, occurs within network:

1. Switch 4's port β recognizes the transaction as being for a domain behind the port. The port's egress channel accepts the transaction and forwards the request to its peer.
2. Switch 1's port β receives the request. Since the request is being received on the port's ingress channel and the channel is connected to a peer, the address field (along with the Requester ID field) is translated. The new target address is 0x0200_0000_0032_1234. Since the operation is a read, a tag value from the port's free tag pool is selected. This tag value is used to store the request's Requester ID and tag number into port's Active Non-Posted Transaction Store. The local tag value is inserted into the request along with the new address value and Request ID.
3. The translated request is presented to the secondary bus of the switch. Switch 1's port χ recognizes the transaction's target as being behind the port. The transaction is accepted and forwarded.
4. Switch 2's port β receives the request. Since request is being received on a port not connected to a peer, no translation is performed on the request.
5. The request is accepted by Switch 2's port χ and forwarded.
6. Switch 3's port β receives the request. Since the request is being received on the port's ingress channel and the channel is connected to a peer, the address field (along with the Requester ID field) is translated. The new target address is 0x0000_0000_0032_1234. Since the operations is a read, a tag value from the port's free tag pool is selected. This tag value is used to store the request's Requester ID and tag number into port's Active Non-Posted Transaction Store. The local tag value is inserted into the request along with the new address value and Request ID.
7. The translated request is presented to the secondary bus of the switch. Switch 3's port α recognizes the write transaction as being behind the port. The transaction is accepted and forwarded.
8. The target of the request returns the completion.
9. Switch 3's port β recognizes the Requester ID value as being the destination for the completion and accepts the completion. Since the port is connected to a peer, the tag within the completion is used to reference the port's Active Non-Posted Transaction Store. The Requester ID and tag from the original request is substituted into the completion packet and forwarded. If the transaction completes the request, the port's free tag pool is updated and a non-posted flow control update is issued.
10. Switch 2's port χ accepts the completion and places it on the switch's secondary bus.
11. Switch 2's port β recognized the Requester ID value as being behind the port. The completion is accepted and forwarded.
12. Switch 1's port χ accepts the completion and places it on the switch's secondary bus.
13. Switch 1's port β recognizes the Requester ID value as being the destination for the completion and accepts the completion. Since the port is connected to a peer, the tag within the completion is used to reference the port's Active Non-Posted Transaction Store. The Requester ID and tag from the original request are substituted into the completion packet and forwarded. If the transaction completes the request, the port's free tag pool is updated and a non-posted flow control update is issued.
14. Switch 4's port β forwards the completion to the originator of the request.

Since non-posted flow control credits are only released after the completion of the original request, CIO ports are preferably designed to advertise a larger than standard amount of non-posted credits. This action reduces the effect of the natural performance bottleneck introduced by the need to release flow control credits after a request had been completed.

PCIe is at the base of a CIO domain. As such, PCIe enumeration is used for configuring a domain. The goal of CIO configuration is to allow the software model used in enumeration to remain the same as a PCIe only network as much as possible.

Figure 17:
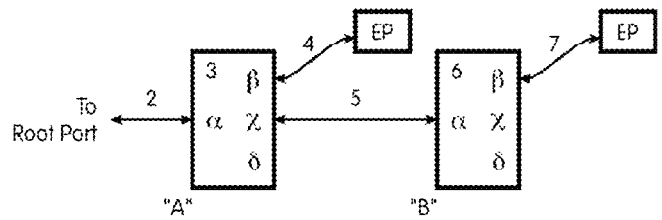
FIG. 17 shows a simple domain.

FIG. 17 shows a simple domain. The bus numbering is the point of interest since configuration is based on the assignment of bus numbers during enumeration. In the example above, the bus number coming into the network is 2. The secondary bus within switch A is 3. Bus 4 is assigned to the EndPoint (EP) connected to switch A. Switch B is assigned to bus 5 and the switch B's secondary bus is 6. The EP connect to switch B is on bus 7.

The routing of traffic based on bus numbers is controlled by three fields at each portal within a switch. These fields are found within the configuration space of a bridge device. The definition of the fields are:

1. Primary Bus Number: This value is the bus number connected to the upward facing interface of a port.
2. Secondary Bus Number: This value is the bus number connected directly to the downward facing interface of a port.
3. Subordinate Bus Number: This value defines the last bus accessible by the downward facing interface of a port.

For the example shown in FIG. 17, there are a total of eight ports. Each switch contains four ports. The following table shows how the bus fields for each port could be set up after enumeration:

|  | Primary | Secondary | Subordinate |
|---|---|---|---|
| Switch A |  |  |  |
| Port α | 2 | 3 | 7 |
| Port β | 3 | 4 | 4 |
| Port χ | 3 | 5 | 7 |
| Port δ | 3 | 0 | 0 |
| Switch B |  |  |  |
| Port α | 5 | 6 | 7 |
| Port β | 6 | 7 | 7 |
| Port χ | 6 | 0 | 0 |
| Port δ | 6 | 0 | 0 |

Figure 18:
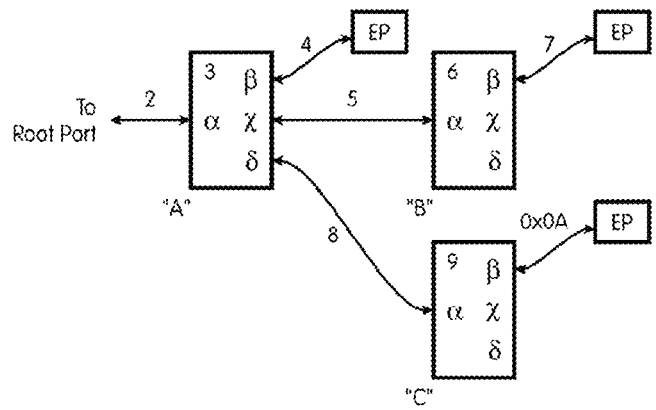
FIG. 18 shows an addition being made to the domain.

Typical PCI enumeration assigns bus number in sequential order as a new bus is found. Once the enumeration has been completed, it only possible to add a device to the end of the bus list. FIG. 18 shows an addition being made to the domain.

When a Hot Plug Event is reported to the domain host, Configuration Software examines the new devices and assign bus numbers accordingly. After the enumeration has been completed, the configuration fields of the switches is:

|  | Primary | Secondary | Subordinate |
|---|---|---|---|
| Switch A |  |  |  |
| Port α | 2 | 3 | 0x0A |
| Port β | 3 | 4 | 4 |
| Port χ | 3 | 5 | 7 |
| Port δ | 3 | 8 | 0x0A |
| Switch B |  |  |  |
| Port α | 5 | 6 | 7 |
| Port β | 6 | 7 | 7 |
| Port χ | 6 | 0 | 0 |
| Port δ | 6 | 0 | 0 |
| Switch C |  |  |  |
| Port α | 8 | 9 | 0x0A |
| Port β | 9 | 0x0A | 0x0A |
| Port χ | 9 | 0 | 0 |
| Port δ | 9 | 0 | 0 |

Since the bus numbers behind a port must be contiguous, the connection of Switch "C" to switch A's port δ has caused switch B's port χ and δ unable to accept a new connection. The reason for this condition is how the bus number are assigned. Since bus 8 is connected to switch A's port δ no more bus numbers can be assigned behind switch A's port χ without having to require the entire bus to be re-enumerated.

Figure 19:
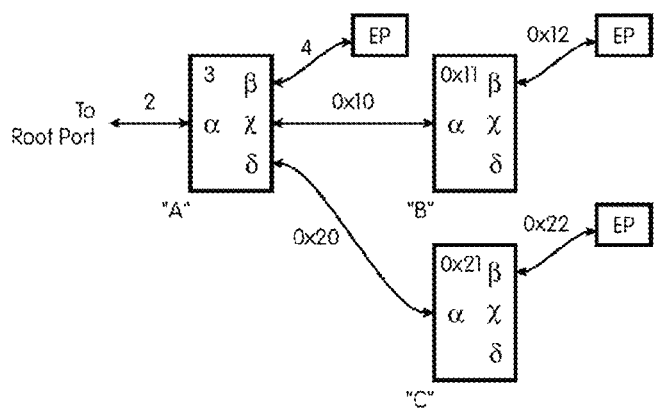
FIG. 19 shows how, during enumeration, ports are assigned a range of bus numbers

A goal for CIO operation is for Plug and Play configuration. To be able to make use of as much of the PCI configuration model as possible bus numbers must not be assigned sequentially. To accommodate the contiguous bus numbering behind a switch port, during enumeration, ports must be assigned a range of bus numbers. As a bus is added, it is assigned a number within the range of buses behind the bridge. FIG. 19 and the following configuration table illustrates the concept.

|  | Primary | Secondary | Subordinate |
|---|---|---|---|
| Switch A |  |  |  |
| Port α | 2 | 3 | 0x2F |
| Port β | 3 | 4 | 4 |
| Port χ | 3 | 0x10 | 0x1F |
| Port δ | 3 | 0x20 | 0x2F |
| Switch B |  |  |  |
| Port α | 0x10 | 0x11 | 0x1F |
| Port β | 0x11 | 0x12 | 0x12 |
| Port χ | 0x11 | 0 | 0 |
| Port δ | 0x11 | 0 | 0 |
| Switch C |  |  |  |
| Port α | 0x20 | 0x21 | 0x2F |
| Port β | 0x21 | 0x22 | 0x22 |
| Port χ | 0x21 | 0 | 0 |
| Port δ | 0x21 | 0 | 0 |

This requirement to pre-assign bus numbers does create issues. By assigning bus numbers to a port which in the future may not have any connections will cause those bus numbers to be lost to the domain. While this document is not intended to solve this issue, a few suggestion to help the problems are:
1. If the device connected to a downstream bridge is an endpoint and the device can not be removed, then the bridge only needs to assign a single bus number to the link.
2. As bus numbers are assigned from within a range, the assignment preferably starts at the middle of the range and work towards both ends of the range. This allows the unused bus numbers behind a bridge to be taken from the bridge and assigned to an adjacent bridge.

When probing downstream from a CIO router's upward facing bridge, the software will encounter only one of two device types. These types are either an endpoint or another bridge. If the device is an endpoint, normal configuration is used to place the device within the domain.

Figure 20:
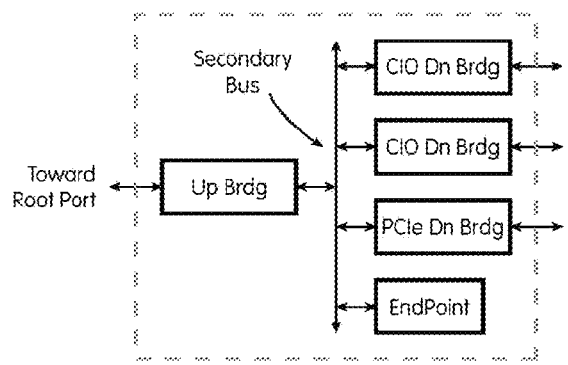
FIG. 20 illustrates the fact that a CIO router may have a mixture of PCIe or CIO bridge ports.

If a bridge is found, then two possible bridge types can be encountered. As shown in FIG. 20, a CIO router may have a mixture of PCIe or CIO bridge ports. If a PCIe bridge is found, then normal configuration code is executed. If the bridge port is a CIO type (determined by either a new device code or looking for CIO registers in the bridge's configuration space), then the configuration code needs to perform a test to determine how the CIO connection is being made.

Figure 21:
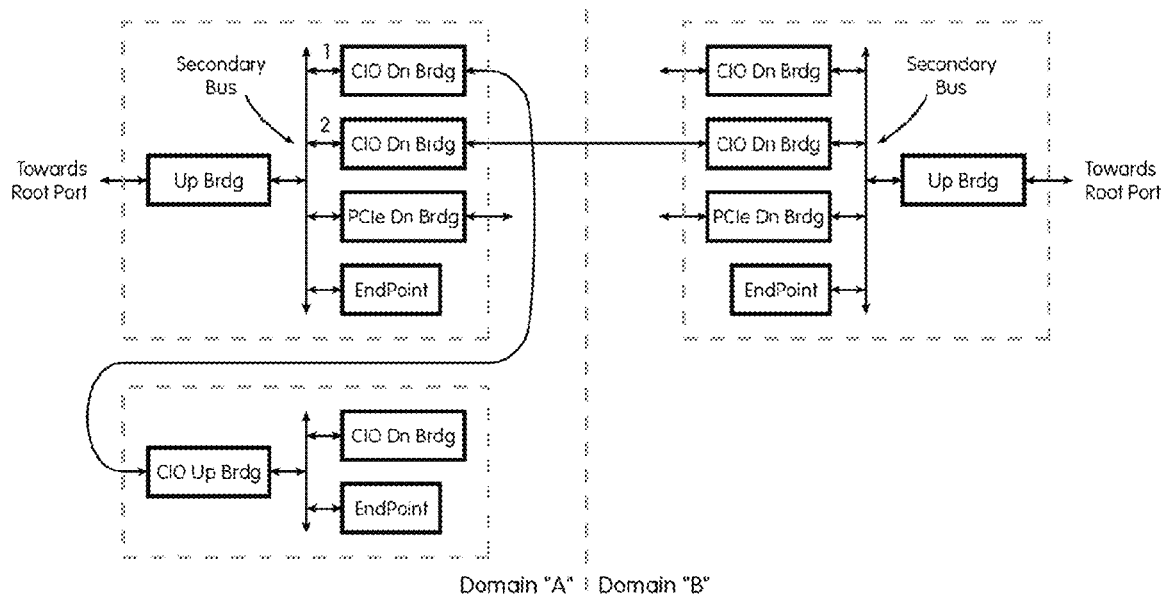
FIG. 21 shows two possible bridge to bridge connection modes.

In FIG. 21, the first CIO router in domain A shows its two downstream CIO ports connect in the two bridge to bridge modes possible. Port 1 is connected to the upstream port of another CIO router. When connected in this fashion, the bridge is operating within the domain and the bridge is configured using a standard PCIe model.

Port 2 of the router is connected to another downward facing bridge port. This interconnect creates a peer-to-peer connection. Software can determine the type of connection the a downward facing CIO port is making by looking for the presents of a secondary function within the port. As discussed above, if an inter-domain connection is made, the downstream bridge will appear to have a secondary function. The function is a new CIO endpoint type with no capabilities and is actually located in the peer's bridge port. When the downstream port makes an intra-domain connection, the secondary function is not present.

When software detects a downstream CIO port, it is required to determine if the port has a secondary function before probing further down the hierarchy. If no secondary function is found, then the software continues to configure the port using the standard PCIe configuration mode. If the port contains a secondary function, then the connection is peer-to-peer and a new method of configuration is required.

Figure 22:
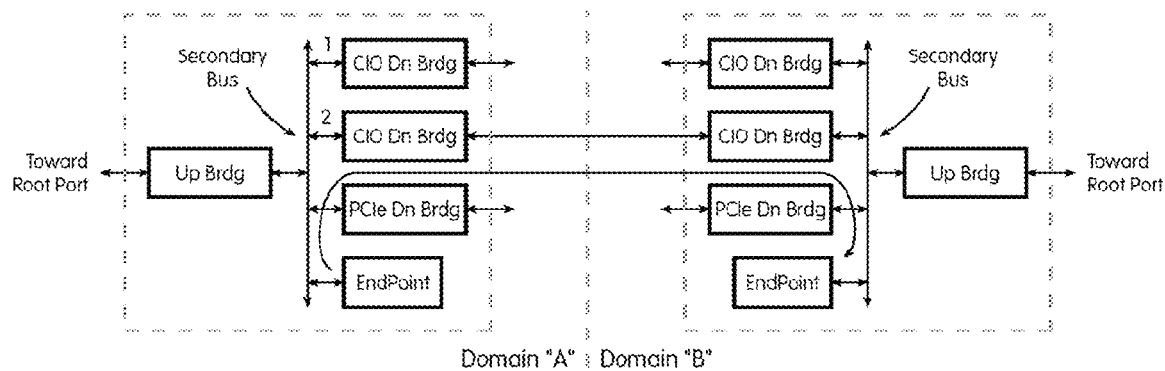
FIG. 22 show communication using vendor defined messages ("VDMs")

Once the presence of a inter-domain connection has been determined, the PCIe method of configuration is no longer used. Configuration between the two domains is accomplished using Vendor Defined Messages. Since no concept of shared memory space between the two domains exist, VDMs along with hardware support within the bridge ports allow software on one host to target a fixed resource in the opposite host's CIO router. This resource is used to accept and generate VDMs. Each side uses a set of messages to inform the host on the opposite side of the connection of requirements needed for mapping the two domains together. An example is shown in FIG. 22.

Software makes use of a PCI entity within the CIO router to issue a message to the peer's version of the entity. When message is received by the peer's hardware, the local host is notified of the event (possibly by MSI). The peer host examines the received message and formats a response. Using the PCI entity originally receiving the host message, the peer causes a response message to be returned to the local host. At the same time, the peer host can be generating the same message stream in the opposite direction. Using a set of messages and other means, the two peers establish a functional connection.

When a Hot Plug event is detected by a bridge port, system software is made aware via some means (possibly by MSI). If the event was caused by a new connection, then software executes the same configuration procedure as if a system boot was in progress. The only difference is that only the resources added to the system would be configured. If a disconnect is the cause of the event, software needs to inform the appropriate tasks and domains of the change of configuration.

Figure 23:
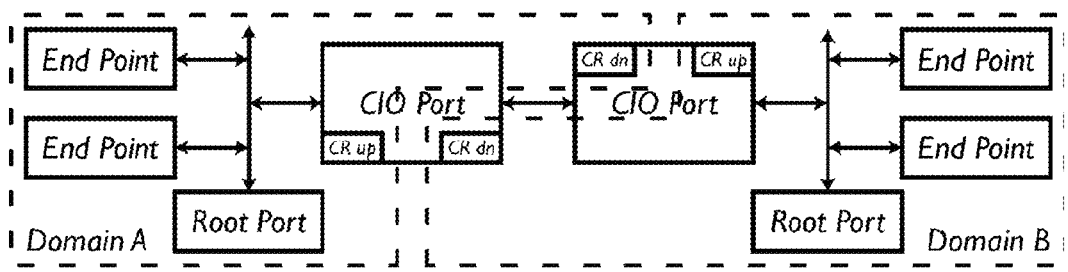
FIG. 23 shows the feature where each CIO port has two sets of Configuration Registers.

FIG. 23 shows the feature where each CIO port has two sets of Configuration Registers needed to support the peer-to-peer operations of CIO. The dual sets of Configuration Registers are used in probing. One register set faces upstream. This register set is the typical configuration register block of a PCIe device. The register set is located at Function 0 of the port and reports the port as being a bridge device. By reporting as a bridge, when the port is connected to another CIO port within the same domain, standard PCIe switch configuration software is used for enumeration.

The second register set is facing down stream. This register will respond at Function 1 of the alien domain CIO port's configuration register block. When the port is connected to a peer domain, the peer domain computer will probe the register and see the bridge has two functions. The detection of a second function for a CIO port causes the peer-to-peer configuration code to be executed.

Figure 24A:
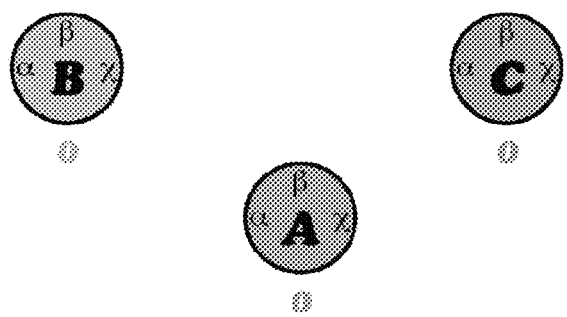
FIGS. 24A-24J show how domains connect to each other.
Figure 24B:
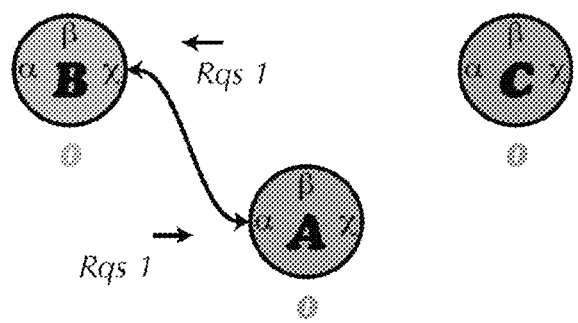

FIGS. 24A-24J show how domains connect to each other. When each domain becomes operational, it has no knowledge of the presence of other domains. Through normal enumeration, each local device is assigned space within system's domain 0 memory space. If three system's are running (A, B, and C) and they are not connected to each other, then each system has the same domain number (0). This is shown in FIG. 24A Assume domains A and B are connected, as shown in FIG. 24B. A Hot Plug event is generated by each CIO router to inform the domain's computer of a new connection being made. At this point neither computer assumes the new connection is for a peer. Each system executes the standard code for a Hot Plug event and probes downstream for the new endpoint. The new endpoint is at Function 1 of the CIO port connected to a peer. As a result of the probe, each domain's computer understands a peer-to-peer connection was being made.

The computers then start the process of assigning domain numbers for the new resource. The first task is for a domain's computer to inform the peer of the number of domains currently attached to itself. This action can be thought as a request to the peer to create new domain numbers for itself and have these number published back to the requester. The communications between the peers is via PCIe's Vendor Defined Messages.

In FIG. 24B, each node is only representing one node (itself). Thus, the request of the peer is to cause the peer to assign a domain number for itself. When a domain makes a request for domain numbers from its peer, the requester already knows how the returned numbers will be assigned to the local domain numbers.

Domain numbers are local within the domain. Configuration software selects a domain number from a free list and sends the value to the peer. Any value for a domain number is valid as long the value is not currently being used within the local domain.

Figure 24C:
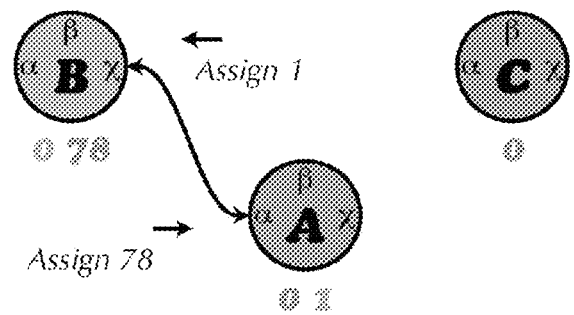

As shown in FIG. 24C, since domain B had a request for only one domain number from domain A, domain A has assigned its new peer the domain number 1. All references for domain B within domain A will use the value 1. This value is forwarded to domain B. Likewise, domain B has assigned the domain number 78 to its new peer. This value is forwarded to domain A.

Figure 24D:
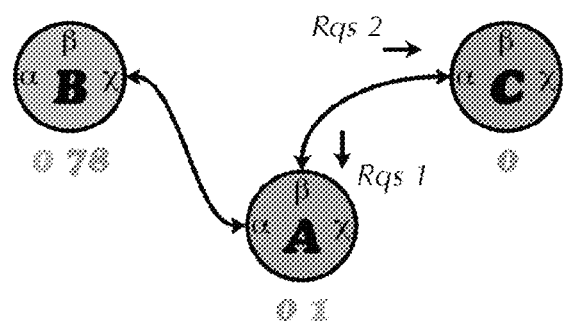

In FIG. 24D, the AB cluster is attached to domain C. Like the previous sequence, the ports detecting the Hot Plug event start probing. In this case domains A and C are involved with the probing of the new connection. At some point, the two domains determine a peer-to-peer connection is being made. The two domains make request for virtual domain number to be assigned.

Domain A makes a request for two domain numbers. Domain A is requesting numbers for the domains it is currently connected too (domain B and itself). The returned virtual numbers will be assigned to domain A's active domain numbers (0 and 1). For domain C, a request for one domain number is made. This request is for itself. Domain B did not receive a Hot Plug event and does not participate in the configuration at the moment.

Figure 24E:
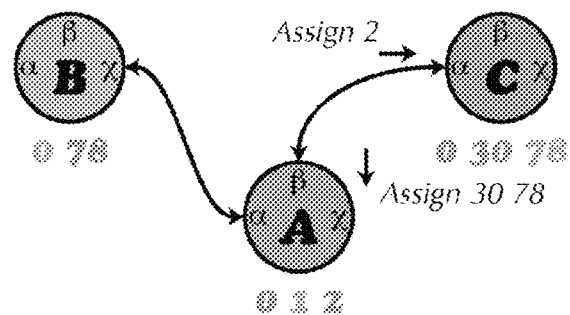

In FIG. 24E, domain A responds to the request for a single domain number by assigning the value 2 for any access targeting domain C. In response to the request of two numbers, domain C issues the values 30 and 78.

Figure 24F:
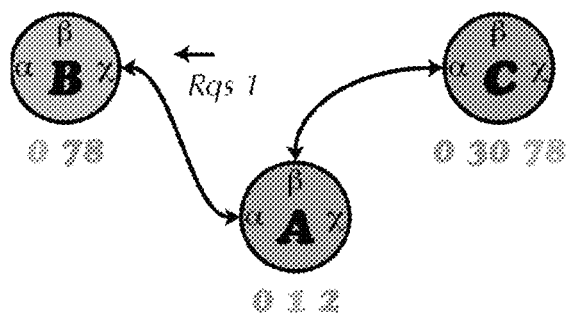

At this point, half of the discovery is complete. Domain B has not been updated, however. The update has not been started since domain B has no knowledge of the Hot Plug event between domains A and C. After the interaction between domains A and C completes, domain A makes a request for a domain number from domain B (FIG. 24F). This action allows domain B to become aware of the addition to the system of new resources. Domain B does not make a request of domain A since no additional domains have been added to domain B.

Figure 24G:
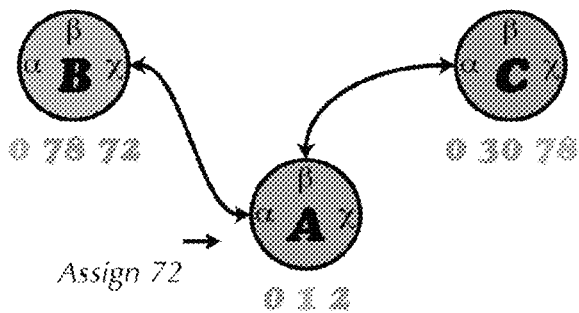

As shown in FIG. 24G, Domain B responds to the request for a single domain number by assigning the value 72 for any access targeting domain C. The new domain number is sent to domain A for assignment.

Figure 24H:
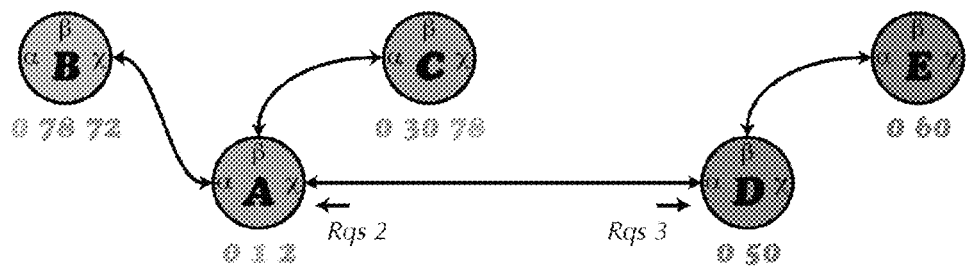

In FIG. 24H, the ABC cluster is attached to a DE cluster. Like the previous sequence, the ports detecting the hot plug event start probing. In this case, domains A and D are involved with the probing of the new connection. At some point, the two domains determine a peer-to-peer connection is being made. The two domains make request for virtual domain number to be assigned.

Figure 24I:
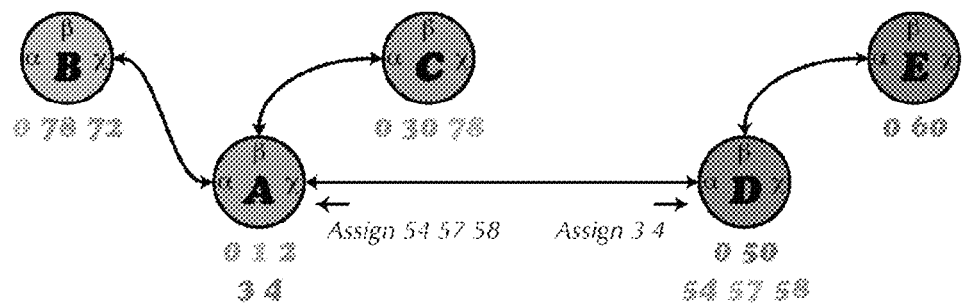

Domain A makes a request for 3 domain numbers. The value 3 represents the number of domains currently connected to domain A. Likewise, domain D makes a request for 2 values. Domain A refers to its list of free domain numbers and choose 2 values. As shown in FIG. 24I, domain D chooses 3 numbers from its free list. The chosen values of one domain are transferred to the opposite domain.

Figure 24J:
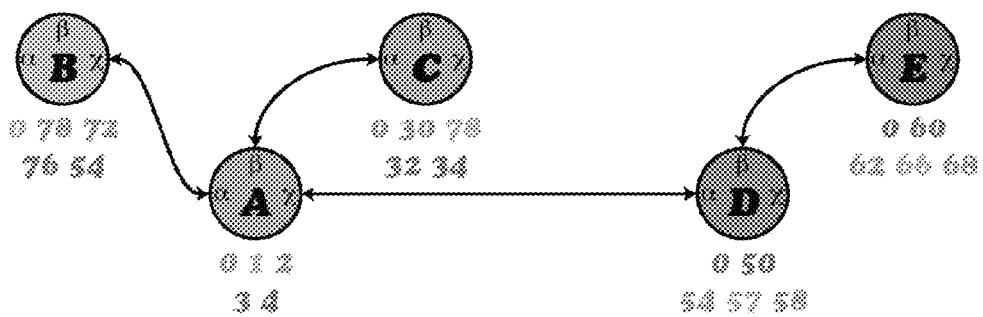

After, the assignments between domains A and D are complete as shown in FIG. 24J, the assignments between the domains connected to domains A and D need to be executed. Domain A makes a request for 2 domain numbers of both domain B and C. Domain D makes a request for 3 numbers of domain E. Domains B, C, or E do not make a request for domain numbers of their peer domain since there has been no new connections to them.

Figure 25A:
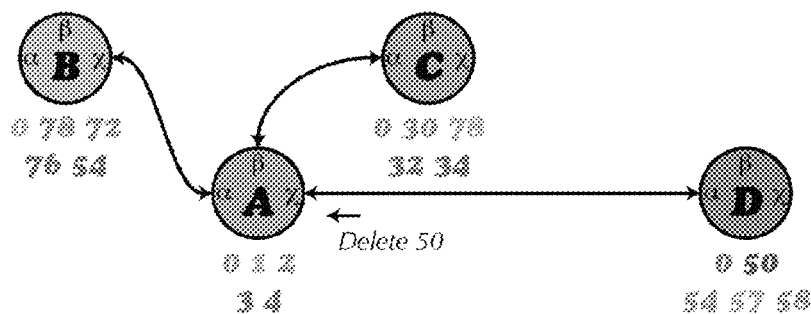
FIGS. 25A-25C show how a disconnection is handled.
Figure 25B:
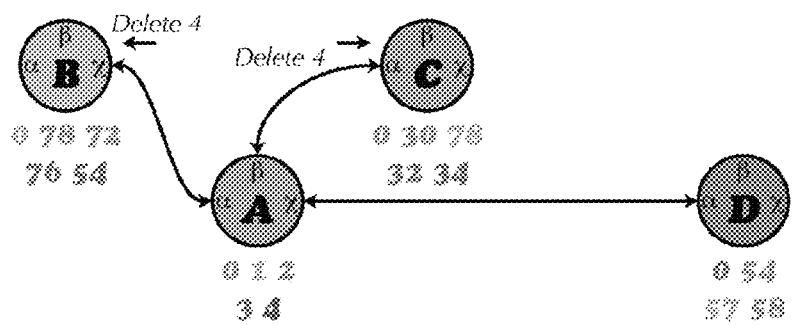
Figure 25C:
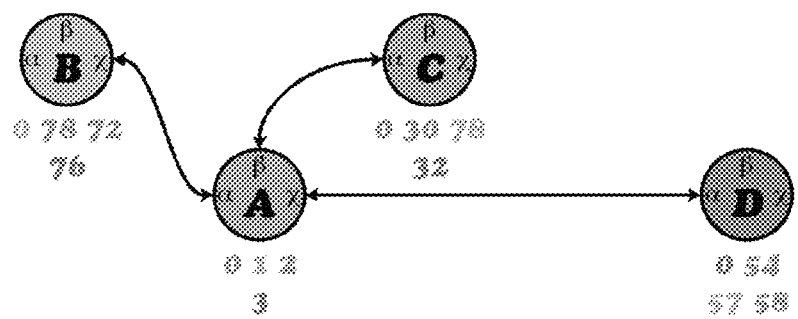

FIGS. 25A-25C show how a disconnection is handled. Any given domain can be removed from the cluster during the operation of the system. When this occurs, the CIO port adjacent to the removed domain signals its computer of the event. The domain detecting the removal has the responsibility to inform the rest of the network. The detecting domain issues a VDM to all the active ports connected to the domain. This message indicates the loss of the a domain and includes the local domain number lost.

The domain receiving the message converts the domain number received in the message into the local number for the lost domain. As shown in FIG. 25B, this value is used to remove the domain from the list of active domains, reconfigure the CIO routers to not recognize the discarded number, and to format a disconnect message to remaining ports connected to the domain.

After all domains have received the disconnect message, as shown in FIG. 25C, no further action is required.

Once the network addressing has been configured after a Hot Plug event has been completed, the new resources available to a given domain must be discovered.

Configuration Example

Figure 26:
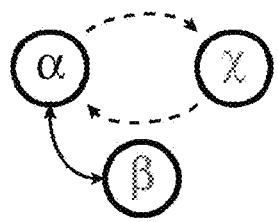
FIG. 26 shows the topology of the network of an example.

FIG. 26 shows the topology of the network of an example to be discussed. The system is composed of three domains ($\alpha$, $\beta$, $\chi$). Domains $\alpha$ and $\beta$ are already connected and configured. The remainder of the document is concerned with the process of connected domain $\chi$ to the other domains via domain $\alpha$.

The inter-domain connection is made with a CIO router. This example will use the same router for both domains. The CIO concept allows for the development of different routers. Inter-connectivity is guaranteed since a minimum set of resources and functionality is required by all CIO routers.

Figure 27:
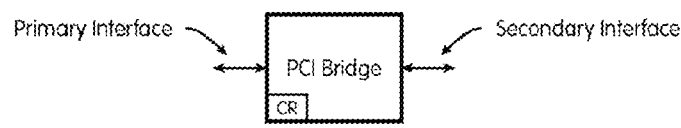
FIG. 27 shows a PCI bridge's two interfaces.

As discussed above, a CIO router has extensions above the PCI bridge model. These extensions are used to support the peer-to-peer traffic. As shown in FIG. 27, the PCI bridge has two interfaces, one connected to the Primary Bus, and the other connected to the Secondary Bus. The function of a PCI bridge is to facilitate the transfer of data between the bridge's Primary Bus and Secondary Bus. Only the interface connected to the Primary Bus is capable of accepting and processing PCI Configuration Cycles. In addition, the interface connected to the Primary Bus is always upward facing.

Figure 28:
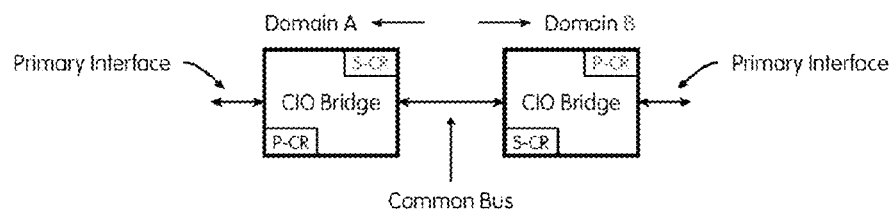
FIG. 28 shows how a peer-to-peer connection creates a Common Bus, not a Secondary Bus.

For a peer-to-peer interconnect, the concept of a Primary and Secondary Bus is foreign. For CIO, a peer-to-peer connection is made when two downward facing interfaces are connected. As shown in FIG. 28, this connection creates a Common Bus, not a Secondary Bus. With this topology, each bridge has two sets of Configuration Registers. The Primary Configuration Register is slaved to the bridge's Primary Interface. The Secondary Configuration Register is slaved to the Peer's Primary Bus. Indeed, the port's Secondary Configuration Space is not visible from the bridge's primary bus. While physically located in the downward facing interface of a bridge, software views the register set as being a secondary function in the Peer's bridge.

Figure 29A:
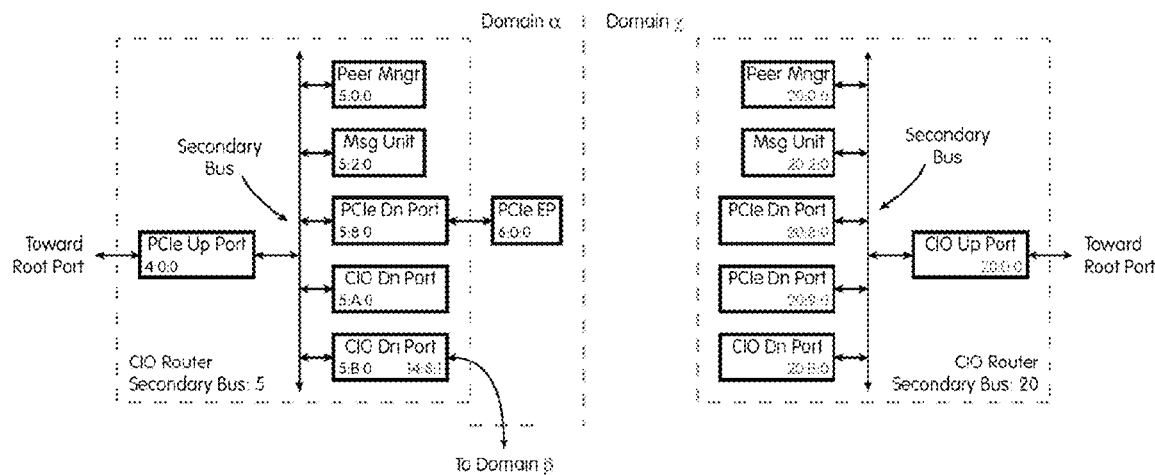
FIGS. 29A-29F show a sequence of events during connection and configuration.

FIGS. 29A-29F show a sequence of events during connection and configuration. FIG. 29A shows the two routers prior to the connection between domain $\alpha$ and $\chi$. The two routers appear to software as PCIe switches. Domain $\alpha$'s router connection towards its Root Port is via PCIe. A PCIe endpoint is connect to the device using a downward facing PCIe bridge. Also, the connection to the domain $\beta$ is made by one of the downward facing CIO ports.

Domain $\chi$ is connected to its Root Port via a CIO port. This implies the router is at least the second CIO device within domain $\chi$. This is assumption is made since currently no Root Ports are CIO devices. The fact this router is not the only CIO device within the domain has no bearing on the example. No other ports in the router are in use. The small numbers inside each block of the routers (x:y:z) are the Bus:Device:Function numbers of the PCIe entity as mentioned above. The terms "Bridge" and "Port" are sometimes used interchangeably. The discussion will center on the transaction required for domain $\alpha$'s configuration. The action taken by both domains is identical and independent of each other.

Figure 29B:
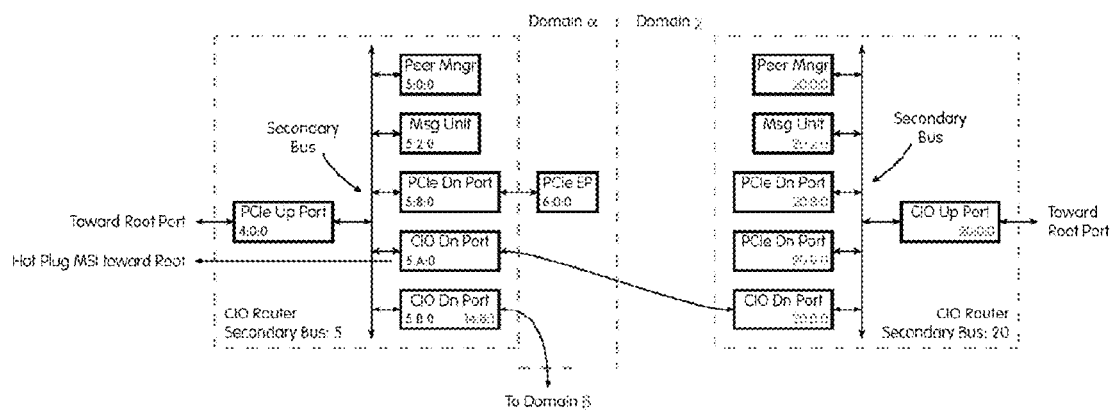

A user would use a CIO "type-A" to "type-A" cable to connect the two domains together. Domain $\alpha$'s port 5:A:0 is connected to domain $\chi$'s port 20:B:0. As shown in FIG. 29B, after the link between the two ports has completed initialization, port 5:A:0 issues an interrupt, e.g., an MSI, to its host. This MSI informs the host of the Hot Plug Event. By various means, the host can determine the MSI was issued by device 5:A:0.

Figure 29C:
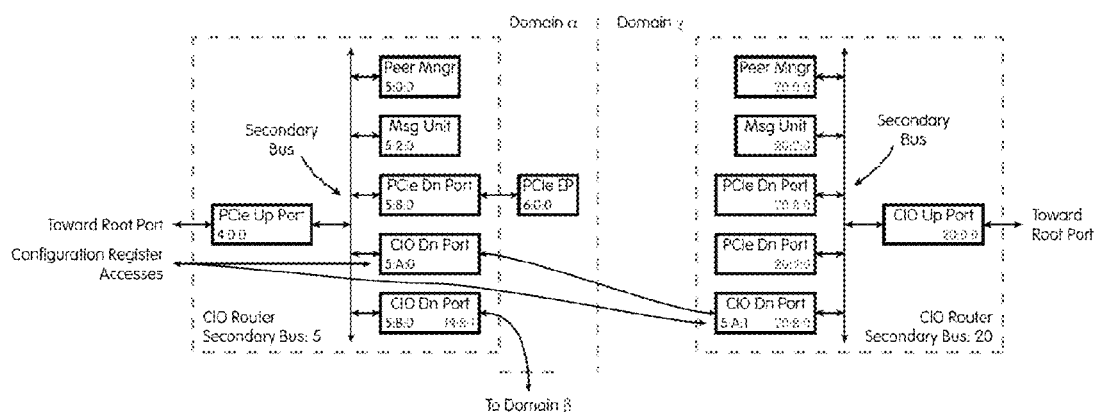

As shown in FIG. 29C, the host response to the Hot Plug MSI is to probe the newly added branch behind Port 5:A:0. At this point in time, the new connection could be either a Intra or Inter domain connection. Software takes the following steps:
 1. Read the Device ID register of Port 5:A:0. The returned value indicates the port was a CIO type bridge.
 2. To determine if an inter-domain connection has been created, software attempts to access the port's secondary function at 5:A:1.
 3. If the returned completion does not contain the Unsupported Request (UR) status code, then the connection is an inter-domain type.

With software determining the new connection as a peer-to-peer type, the standard PCI configuration is terminated. Further configuration is accomplished using a series of VDMs. Software will issue and receive messages by using the PMU.

The Inter-domain configuration software running on domain $\alpha$ makes use of the message translation function in the CIO ports to access the PMU located in the adjacent CIO router. (Refer to the document "Converged I/O Message Concepts") Because of the resources required by a CIO router, the configuration software is able to start interacting with the unknown peer without knowledge of the peer's capabilities.

Domain $\alpha$'s view of the world consist of two domains, itself (#0x00) and $\beta$ (#0x14). The number of domains connected to domain $\alpha$ must be communicated to domain $\chi$. This communication is performed using a VDM.

Figure 29D:
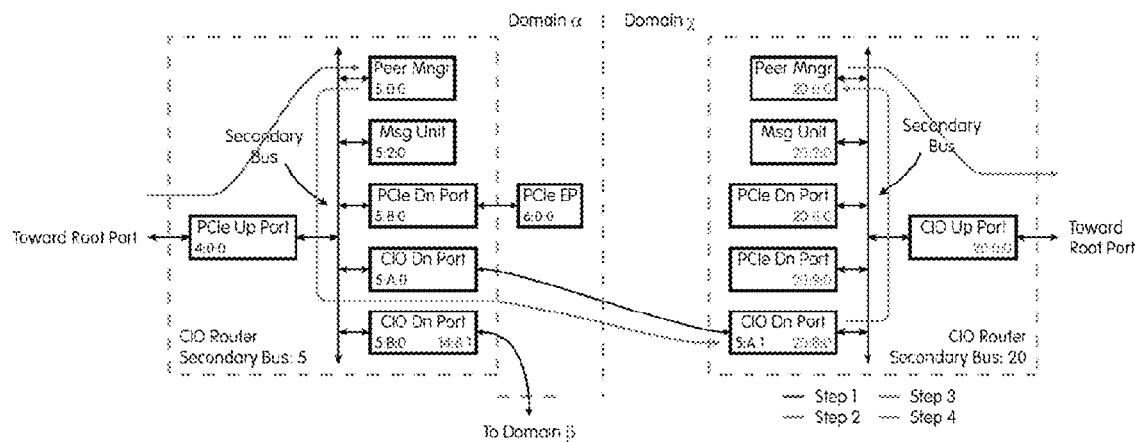

Software takes the following steps, as shown in FIG. 29D:
1. Instruct the PMU (Entity 5:0:0) to produce a VDM. The Peer Advertisement message informs the peer that two domains have been attached. The VDM uses the Route by ID message form. The target ID value used is 5:A:2.
2. The message is issued by the PMU. With the target ID value 5:A:2, the message is accepted by the CIO port 5:A. Since the target function number is not 0, the port forwards the message down the link.
3. The message is received by the peer's CIO port. The message header is modified. The Requester ID is changed from the originator's (5:0:0) to the port's (20:B:0). The Target ID is changed from 5:A:2 to 20:0:0. With the new header, the message is forwarded to the router's backbone and delivered to the domain χ's PMU.
4. With the reception of the message, the PMU issues an MSI to domain χ's host. In response to the MSI, domain χ's host fetches the message from the PMU.

With the reception of the Peer Advertisement message from domain α, domain χ knows two peer have been connected to it. The host must assign a domain number to each of the alien peers. These domain numbers are used by domain χ to access resources outside of itself. Like all domain hosts, the value 0x00 is used by χ to represent itself. For this example, the values 0x30 and 0x40 are used for the alien domains.

Figure 29E:
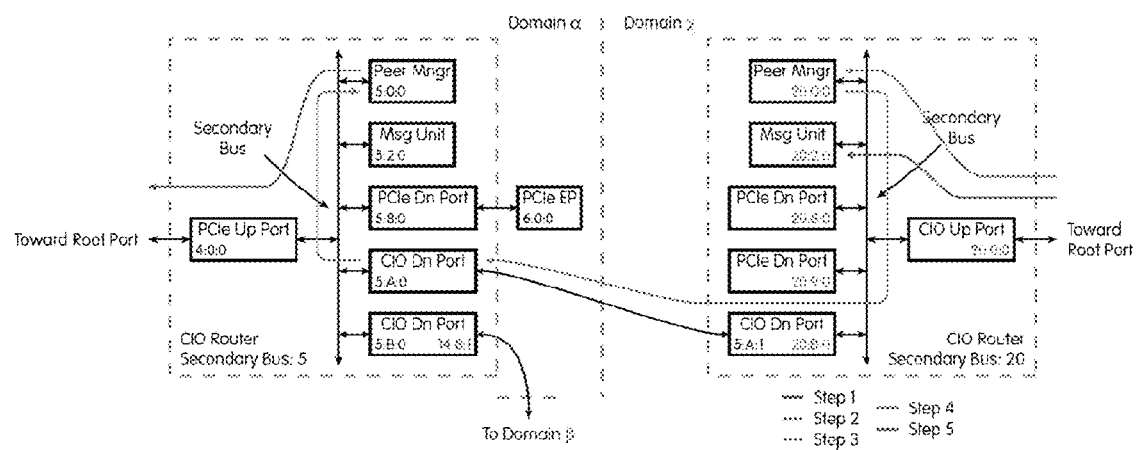

Software takes the following steps, as shown in FIG. 29E:
1. Domain χ's host programs the domain Location RAM of the Message Unit (MPU (20:2:0)) in the CIO router with the bus and device number for the CIO port used in the egress of messages targeting domains 0x30 and 0x40. The value placed into the RAM for both domain values will target CIO port 20, 8, x. Note: The domain Location RAM in each CIO router within χ's domain is programmed with the same value.
3. Domain χ's host instructs the PMU (20:0:0) to issue a Peer Creation message. The target of the message is the domain α's PMU. The target ID value for the message is 20:B:2. The message contains the domain numbers being used by domain χ's (0x30 and 0x40).
4. The message is issued by the PMU. With the target ID value 20:B:2, the message is accepted by the CIO port 20:B. Since the target function number is not 0, the port will forward the message down the link.
5. The message is received by the peer's CIO port. The message header is modified. The Requester ID is changed from the originator's (20:B:0) to the port's (5:A:0). The Target ID is changed from 20:B:2 to 5:0:0. With the new header, the message is forwarded to the router's backbone and delivered to the domain α's PMU.
6. With the reception of the message, the PMU issues a MSI to domain α's host. In response to the MSI, domain α's host fetches the message from the PMU.

With the reception of the Peer Creation message from domain χ, domain α knows the two domain numbers domain χ will be using to access the alien domains. (Note: domain χ does not know what domain is referenced by a given domain number.) Since domain χ's alien domain numbers (0x30 and 0x40) may not be the same numbers used within domain α, a mapping function must be configured. The domain numbers used within α are 0x00 (α), and 0x14 (β). With the receipt of domain χ's domain numbers, domain α's host can create the mapping between the two domains.

The method used for the assignment is not important. For example the mapping could be α's 0x00:χ's 0x30 and α's 0x14:χ's 0x40. Two RAMs within domain α's Message Unit are programmed to perform the translations.

Figure 29F:
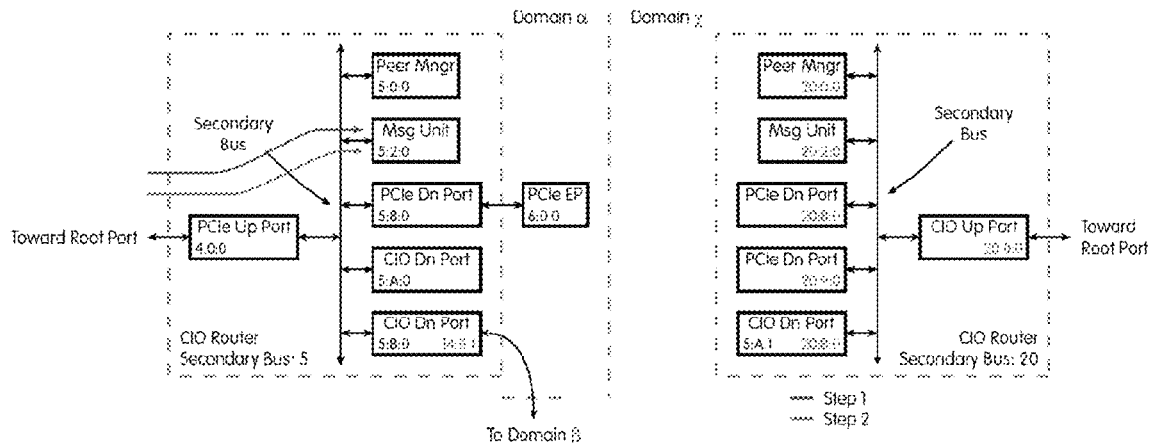

Software takes the following steps, as shown in FIG. 29F:
1. Domain α's host programs the domain Destination Mapping RAM of the Message Unit located in the CIO router containing the CIO port connected to domain χ. Using the port number and the received domain numbers from χ to create the RAM's index; the value is 0x00 is place into the location referenced by χ's 0x30 and the value 0x14 is place into the location referenced by χ's 0x40.
2. Since one of the domain numbers received from χ refers to another alien domain, α's host has another translation RAM to be programmed. This translation is the mapping between domain χ and β via domain α. The second RAM to be configured is the domain Source Mapping RAM. This RAM is located in the Message Unit of the CIO router containing the CIO port connected to the alien domain being referenced. In this example, the Message Unit is the same device configured in step 1. This unit is used since domain β connection is made by this router. The index used to reference the RAM is formed by combining the egress port number and domain number created by domain α for referencing domain χ. (The creation of α's domain number for domain χ is the result of the configuration process initiated by domain χ.)

As stated before, all the steps list above are playing out in reverse for domain χ's host. When domain α receives the Peer Creation message and completes the hardware configuration its configuration task has not been completed. When domain α receives χ's Peer Advertisement message, the host has the responsibility to start a configuration sequence with domain β.

In the case of advertising to domain β, domain α only advertise 1 peer. One peer indicates the addition of a single peer (χ). The same sequence of sending the Peer Advertisement message to domain β, and receiving the Peer Creation message from β is followed. Domain β, however, has no need to advertise a peer. The reason for this action is no new peers have been added directly to β.

For a domain issuing a Peer Advertisement message, configuration is completed with the issuing of a Peer Complete message. In this example, when domain α issues a Peer Creation message, the domain does not know when χ has completed the task and the configuration is complete. The Peer Complete message provides the needed interlock between peers.

Peer Complete message is issued by a domain when all the domain's outstanding Peer Advertisement message have been acknowledged with a Peer Creation messages. This rule must include Peer Advertisement message not yet issued. In the example being used, both domain α and domain χ need to issue the message. When the two domains issue the message is different, however.

For the Peer Advertisement issued by domain χ, the Peer Complete message is issued once the action required by the Peer Created message received from domain α has been completed. The target for the message is α. For domain α, the issuing of the Peer Complete message is dependent on receiving a Peer Created message from both domain β and domain χ. When both Peer Created messages have been received, domain α will issue a Peer Completed message back to both domains. Once again, since domain β did not issue a Peer Advertisement message, it does not issue a Peer Complete message.

Figure 30:
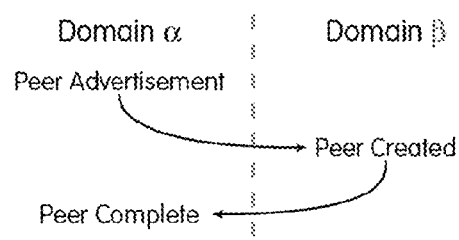
FIG. 30 shows the message sequence discussed in the example of FIGS. 29A-29F.

FIG. 30 shows the message sequence discussed in the example. After the Peer Complete message has been received by all domains, the next step in the configuration can begin. This step cause the domains to publish their capabilities to each other.

Additional Operating Features

For CIO's peer traffic to exist, new hardware will be required. Since processors are not capable of creating a VDM directly, the new hardware is required to undertake several actions for VDM transport. The following action list represents a simplified view of the action needed for the transport:
1. A block of data needs to be fetched from a domain's memory.
2. The data is encapsulated by adding a VDM header to the data.
3. The VDM is transported via PCIe protocol.
4. The VDM reaches its destination and the header is removed.
5. The received data block is placed in the target domain's memory.

To accomplish steps 1 and 5, a DMA resource is required. As such almost any DMA engine can be used for the task. Step 3 is handled by the routing capabilities of a PCIe switch. Steps 2 and 4 (and others) are handled by new hardware or a combination of new hardware and software. While this new hardware could be incorporated into an existing DMA unit, the hardware is assumed to be a standalone PCI entity, namely message processing unit (MPU) 120. With reference to FIG. 2, the PCIe and CIO ports are the router's interface to the external world. The MPU, and DMA entities are directly involved with the creation and transport of VDM used in peer-to-peer traffic.

Figure 31:
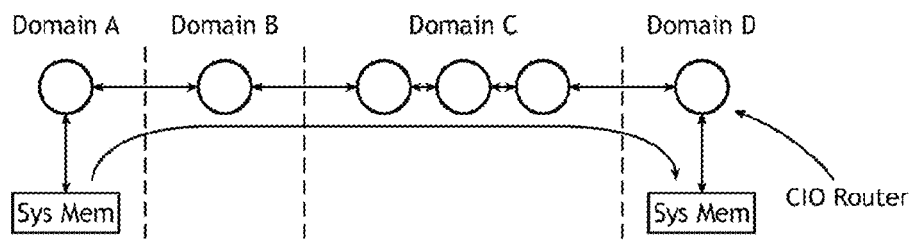
FIG. 31 shows the task of peer-to-peer traffic transfer.

FIG. 31 shows the task of peer-to-peer traffic transfer. Some type of command/data located in domain A's memory is to be transported to domain D's memory. Once the command/data has been received by domain D, the local system can deal with the request. The traffic moves between the originator and target domains through several CIO routers.

Figure 32:
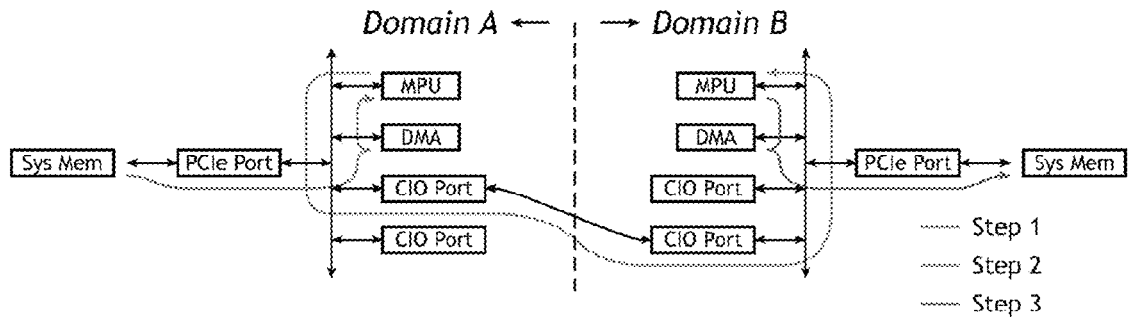
FIG. 32 shows a simplified transaction of transporting a peer-to-peer message.

FIG. 32 shows a simplified transaction of transporting a peer-to-peer message, which includes the following:
1. Domain A's DMA is instructed to fetch a block of data from its system memory and place the block into the MPU.
2. Domain A's MPU converts the block into a VDM. The VDM is presented to the local switch fabric. The VDM is routed across the peer boundary and delivered to domain B's MPU.
3. Domain B's MPU strips away most of the VDM header and informs its DMA of the message block presents. The DMA fetches the block and places into system memory.

As stated earlier, peer-to-peer traffic makes use of PCIe defined VDMs. Peer oriented VDMs are routed using the PCIe's ID Based routing. ID based routing makes use of the PCI Configuration model of referring to a PCI entity by the entities bus number, device number, and function number. This routing method, however, is only useful within a domain. For peer-to-peer transfers, the concept of domain numbers is used.

The table below shows the format of a VDM, which includes a 16-byte (four-DWord) header and a payload.

| Header DWord | 0 | Bits 31:0 (PCIe defined) | |
|---|---|---|---|
| | 1 | Requester Bus/Device/Function | Bits 15:0 (PCIe defined) |
| | 2 | Target Bus/Device/Function | Vendor ID |
| | 3 | Command/Request | Source Domain / Dest'n Domain |
| | Payload | 0 | |
| | | ... | |
| | | N | |

Of the 16 bytes in the VDM header, the first 12 bytes (three Dwords) are defined by the PCIe specification and are used in the routing of the packet within a domain. The last DWord of the header is to be used by the vendor, and is used here to hold three fields as follows:
Bits 31:16—the Command/Request Field, which holds information on how the payload is to be processed.
Bits 15:8—the domain number of the source of the VDM.
Bits 7:0—the domain number of the destination of the VDM.

As mentioned above, the domain numbers defined within a domain are local to the domain. When a message is formatted, the Source domain number is the number the originating domain has given to itself (always 0). The Destination domain number is also a number (non-zero) the originating domain has assigned. This implies all peer-to-peer messages use a virtual addressing mechanism.

Figure 33A:
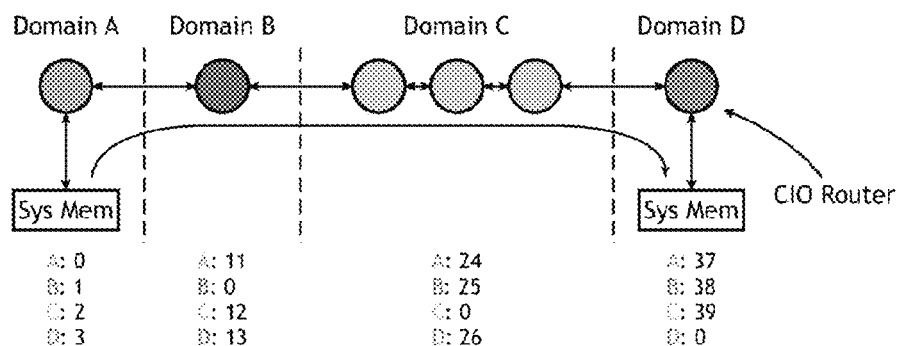
FIGS. 33A-33C show a sequence of events in an example of four domains.
Figure 33B:
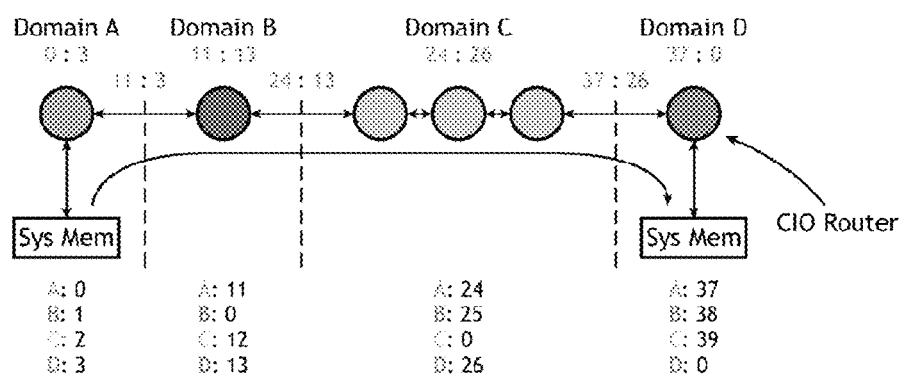
Figure 33C:
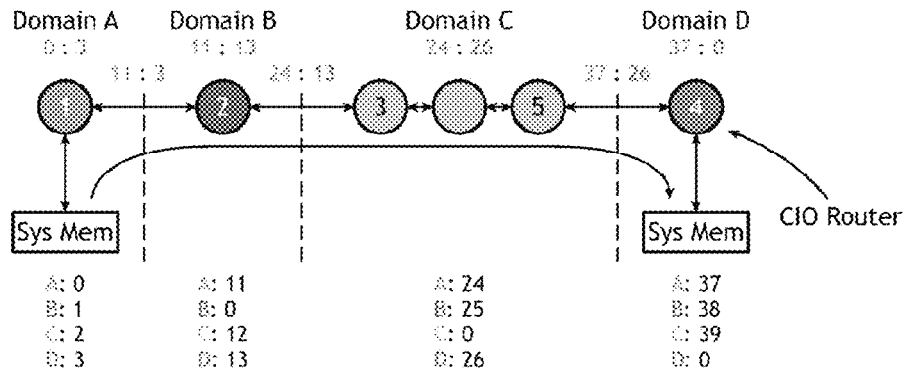

FIGS. 33A-33C show a sequence of events in an example of four domains A, B, C, and D with peer-to-peer connections between domains A and B, between B and C, and between C and D. For purposes of explanation consider domains A, B, C, and D being arranged from left to right. In this example, Domain C has three routers with the leftmost router having the peer-to-peer connection to a router in domain B, which router in domain B also has the peer-to-peer connection to a router in domain A. In this example, the rightmost router in domain C has the peer-to-peer connection to a router in domain D. Thus the routers can be designated as follows:
A1 - - - B1 - - - C1-C2-C3 - - - D1
where three hyphens signify a peer-to-peer connection and a single hyphen signifies an intra-domain connection.

In this example, as shown in FIG. 33A during peer discovery the domains have provided and received the following domain assignments for the four domains:

| | Domain Nos. in Domain A's space | Domain Nos. in Domain B's space | Domain Nos. in Domain C's space | Domain Nos. in Domain D's space |
|---|---|---|---|---|
| Assignment for A | 0 | 11 | 24 | 37 |
| Assignment for B | 1 | 0 | 25 | 38 |
| Assignment for C | 2 | 12 | 0 | 39 |
| Assignment for D | 3 | 13 | 26 | 0 |

In the example, a message originates in domain A and is to be delivered to domain D. Domain A's host creates a message in its system memory. Assume the message contains 128 bytes of payload. The DMA resource in domain A fetches a total of 132 bytes (128 bytes of payload and four bytes to be used as the fourth DWord of the header). In this case, the Source/Destination pair (S:D) is 0:3.

As the message flows between domains, the S:D pair is modified. Within a given domain, the pair reflects the local domain's view of the interconnected peers. By the time the VDM is delivered, the S:D pair has the destination's domain mapping of the peers. The 128-byte payload plus the 4th DWord of the header is placed extracted from domain's D MPU and placed into the local system memory by the DMA resource.

More specifically, as shown in FIG. 33B, the S:D pair in the message transferred between peers has a mixture of domain codings. The Source value is relative to the domain receiving the message. The Destination value is relative to the domain sending the message. Thus the successive S:D pairs are 0:3, 11:3, 11:13, 24:13, 24:26, 37:26, and 37:0 since each domain translates the source and destination values based on the values assigned during peer discovery.

While the domain number routing is how the software manages peer traffic, this method is outside the model defined by PCIe. As stated earlier, peer VDMs use ID based routing. By using ID routing, several consequences must be understood and managed.

1. ID routing is only valid within a domain. When a domain crossing occurs, the VDM must pick up the relative IDs for the current domain.
2. A domain number contained in a VDM has a relationship to the ports transporting the VDM. This relationship is express through the port's ID value.
3. The transfer of a peer VDM between domains occurs between the MPUs of physically connected CIO routers.
4. As a VDM moves between peers, the concept of Ingress and Egress is used in the management of IDs.
5. For transporting a VDM between peers, a MPU operates in different modes. The VDM acts as either an Ingress or Egress.

For the transport of a VDM, the MPU operates in one of six modes. The mode a MPU operates is determined by the processing the VDM requires. A VDM will require the MPU to enter two modes to enable its transport. The six modes are summarized in the following table.

Construction: The construction mode occurs once the DMA resource delivers a block of data to be formatted into a VDM. This operation is the start of the VDM transport.
Peer Egress This mode occurs when a MPU contains VMD and the target MPU for the message resides in an alien domain.
Peer Ingress This mode occurs when a VMD is received from an alien domain.
Domain Egress This mode occurs when a MPU contains VMD and the target MPU for the message resides in the current domain.
Domain Ingress This mode occurs when a VMD is received from within the current domain.
Deconstruction: This mode occurs when a MPU has a VMD and the target for the message is the current domain. The header is removed and the remaining data of the message is made ready for delivery to the domain's system memory by the DMA resource.

As a VDM passes through a Message Processing Unit, the MPU will need to enter two of the six possible modes. The modes entered are governed by where the message is along its path between the VDM Source and Destination. FIG. 33C shows schematically how an MPU can enter valid mode pairs a for a given VDM. The following list contains these mode pairs:

1. Construction—Peer Egress: A data block is received from the DMA resource, formatted into a VDM. Source Peer Mapping is performed and presented to the Switch backbone.
2. Peer Ingress—Peer Egress: A VDM is receive from a Peer and Destination Peer Mapping is performed. Source Peer Mapping is performed and presented to the Switch backbone.
3. Peer Ingress—Domain Egress: A VDM is receive from a Peer and Destination Peer Mapping is performed. The VDM is presented to the Switch backbone.
4. Peer Ingress—Deconstruction: A VDM is received from a Peer and Destination Peer Mapping is performed. The message header is removed and the DMA resource is signaled to place the data into the domain's system memory.
5. Domain Ingress—Peer Egress: A VDM is received from MPU within the domain. Source Peer Mapping is performed and presented to the Switch backbone.

The preceding illustrates how MPUs are used to transfer a VDM from domain A to domain D. The VDM starts as a data block in the domain A's system memory. When space is available, the MPU signals the DMA resource in the router to fetch both the header's 4th DWord and payload from system memory. The 4th DWord fetch may or may not be part of the payload fetch. With the completion of the DMA operation, the MPU performs the mode pair #1. When the VDM is created, the MPU transition from the Construction mode to the Peer Egress mode. The VDM is format is modified for transport and presented to the router's backbone. The message is transferred out of the CIO port connected to the next peer.

When the VDM is received in domain B's MPU, the mode pair #2 is executed. The router device with the MPU possess to both the Peer Ingress Port and Egress Port needed for the message transport. After the required conversions to message header, the message is forwarded to domain C.

When the message is received at domain C, the MPU executes the mode pair #3. The message is received from an alien peer and is converted to local domain's numbering. After the conversion, the next MPU to be targeted is not a peer unit but a unit within the domain. The VDM format allows the message to be transfer within the domain.

When the message arrives at the MPU attached to the next peer, the MPU executes the mode pair #5. The VDM is format is modified for transport and presented to the router's backbone. The message is transferred out of the CIO port connected to the next peer.

With the arrival of the message at domain D, the VMU executes the mode pair #4. The message has reached its destination. The header is removed. The DMA resource is instructed to place the 4th DWord of the header and the payload into system memory.

When a MPU has space for one or more messages to originated from the local domain, the DMA associated with the MPU is informed of the space. If the DMA has a message data block transfer pending, the DMA will fetch the header's 4th DWord and payload for the message. Else, message creation is idle until the system instructs the DMA unit to start a fetch sequence.

When the DMA completes the fetch, the MPU appends three DWords to the front of the received data block. The appended DWords create the first three DWords of the VDM's header. While most fields within these DWords are fixed, the following fields are created dynamically based on the data block received.

Length: The Length Field reflect the number of DWords contained in the payload fetched. The fetch value does not include the DWord to be used as the 4th DWord of the header.
Format: The Format Field is dependent on the value of the Length Field. If the length value is zero, the Format Field indicates "Msg". Else, the field contains the pattern for "MsgD".

Figure 34:
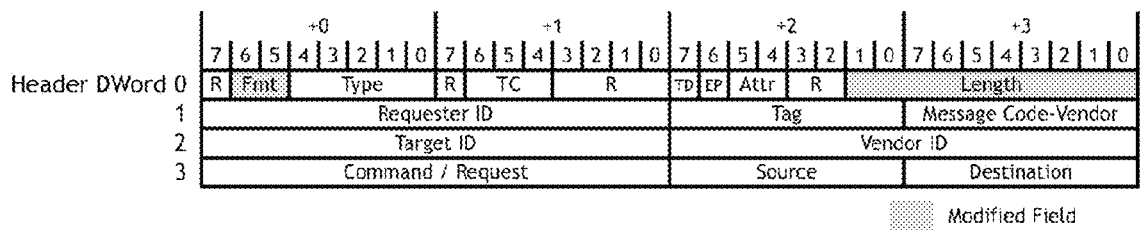
FIG. 34 shows header formatting.

Once the header formatting has been completed, as shown in FIG. 34, the MPU continues to prepare the message by executing the tasks defined by the Peer Egress mode. The transition to Peer Egress is forced since the VDM is to be constructed in the CIO router physically connecter to the next peer in the transport chain.

Figure 35A:
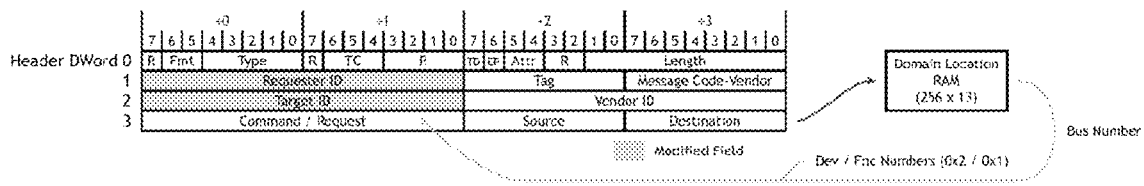
FIGS. 35A-35C show the header modification that takes place during an Egress state.
Figure 35B:
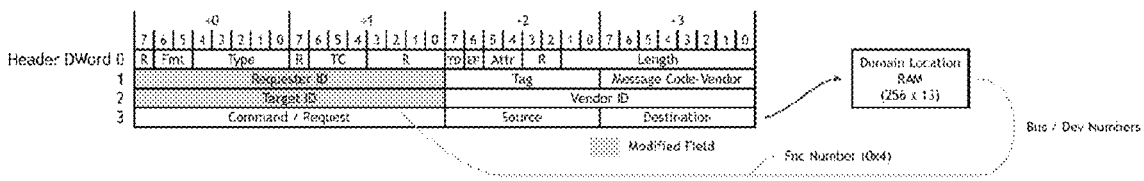
Figure 35C:
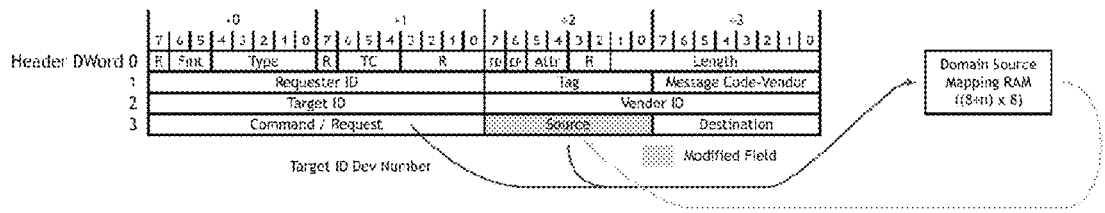

FIGS. 35A-35C show the header modification that takes place during the Egress state. Before a message can be presented to the router's backbone, several fields need to be modified. The first field to be changed is the Requester ID. The values of the MPU's Bus, Device, and Function numbers are used for the Requester ID. The bus number is the Secondary Bus number of the router device containing the MPU. The MPU is always device 0x2 in a CIO router. The Function number is 0x0.

When the MPU has a message to be forwarded, the egress port for the message must be determined. If the peer egress port is contained within the local router device, then the MPU must perform the Peer Egress function. If the peer egress port is located in another router device, the MPU performs the domain Egress function.

The egress port location determination is made by the use of a domain Location RAM in the MPU. This RAM contains the mapping between the Destination domain number and the port where the message is to be forward. The mapping RAM is organized as a 256 locations by 13 bits array. The VDM's Destination domain Number is used as the index into the RAM. The value recovered from the RAM is the Bus and Device numbers of the egress port for the message. The bus number of the egress port has been found.

With the bus number for the message's egress port, the type of egress operation the MPU is performing can now be determined. If the target bus number does not equal the Secondary Bus number of the MPU's router, then the operating mode is domain Egress. The Target ID field is populated with three values. The ID's Bus field is loaded with the egress port's bus number from the domain Location RAM. The ID's Device field has the value 0x02 loaded. The ID's Function field has the value 0x01 loaded. The resulting ID will cause the MPU located in the CIO router containing the egress port connected to the next peer to be targeted. The reformatting of the message is complete and the message is presented to the router's Secondary Bus.

If the target port's bus number is the same as the MPU, then the Peer Egress mode is entered. Like the domain Egress mode, the Target ID field is populated. Both the Bus and Device fields take on the values retrieved from the domain Location RAM. The ID's Function field has the value 0x04 loaded. The resulting ID will cause the egress port located in the local router to accept and forward the VDM to the connected peer.

One more translation is required by the Peer Egress mode. The domain Source Field is to be updated. The value currently contained in the field is relative to the current domain. The value must be converted to the value for the next domain. This conversion is relative to the port the message will use to egress. The relation between current and next Source numbers and egress port is made during the peer configuration.

The translation information is held in the MPU's domain Source Mapping RAM. The VDM's domain Source Field and the new Target ID Device field are combined to create the index used to reference the mapping RAM. (The Device field is adjusted before use to reduce the sized of the index.) The value returned from the mapping RAM is the domain Source number relative to the target alien peer. The value is placed into the domain Source Field of the header. With this action complete, the message is presented to the router's Secondary Bus.

Figure 36:
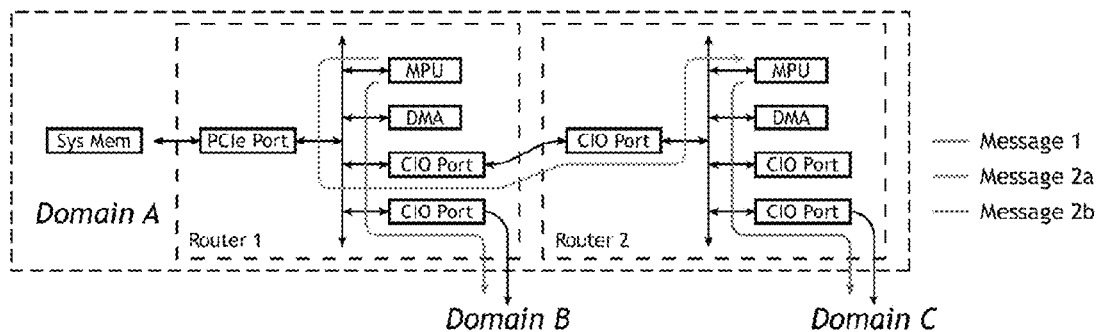
FIG. 36 illustrates the transfer path taken for two different messages.

FIG. 36 illustrates the transfer path taken for two different messages. Message 1 targets an alien peer connected to a port local to the VDM. The MPU performs a Peer Egress mode operation and the message passes directly out of the router and domain. Message 2 targets an egress port in the second router. The Router 1's MPU performs a domain Peer mode operation and the message is transferred to the MPU of the second router (Message 2a). Router 2's MPU performs a Peer Egress mode operation and the message passes directly out of the router (Message 2b).

Figure 37:
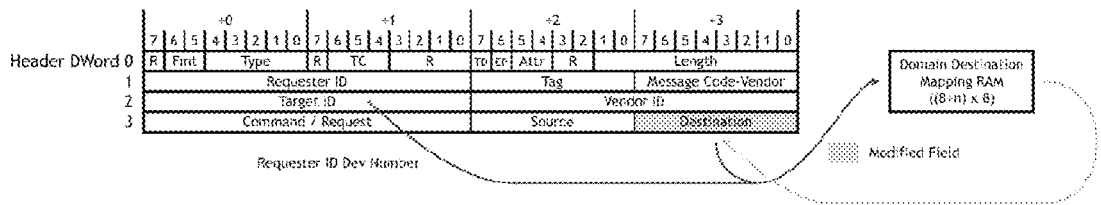
FIG. 37 shows processing during Ingress mode.

FIG. 37 shows processing during Ingress mode. When a message is received by an MPU, the message is processed using one of two modes. The mode used is either domain Ingress or Peer Ingress. Domain Ingress is used when the received VDM from another MPU located within the current domain. Receiving a VDM from within the current domain occurs when the peer ingress and egress boundary crossing for the VDM is not the same router device. The Peer Ingress mode occurs when the peer ingress port is contained in the same router as the MPU.

The determination for the operating mode is made by examining the Target ID value of the message. If the Function field of the Target ID is 0x0, then the message was received directly from an alien peer. In this case, the operating mode is Peer Ingress. If the Function field equals 0x1, the message was received from another MPU from within the current domain, and the MPU's operating mode is domain Ingress. In the domain Ingress case, no modification of the message header is required. The MPU immediately enters the egress operating mode.

The task the Peer Ingress mode performs is domain number mapping. The received message Source domain Field is relative to the current domain. (This translation was done at the previous egress MPU.) The Destination domain Field value is, however, still relative to the domain where the message exited. The Destination domain Field must be translated to the local domain number.

The translation information is held in the MPU's domain Destination Mapping RAM. The VDM's domain Destination Field and the message Requester ID's Device field are combined to create the index used to reference the mapping RAM. (The Device field is adjusted before use to reduce the sized of the index.) The value returned from the mapping RAM is the domain Destination number used within the current domain. The value is placed into the domain Destination Field of the header.

The next mode the MPU is to enter is based on the translated Destination value. If the new destination value is 0x0, then the message has be received by the targeted domain, the MPU enters the Deconstruction mode. Else, the VDM is transiting the current domain, the MPU enters the egress mode.

When the Deconstruction mode is entered, the MPU removes the first three DWords of the header. The remaining header and any payload is made ready of the router's DMA resource. The DMA unit pulls the remaining DWords of the message from the MPU. The data is placed into the Destination's system memory. The transport of the message is complete.

The discussion of the message transport to this point assumed a level of hardware support. The hardware support level does not represent the maximum amount possible, but rather a support base line. This level of support has certain system performance advantages. Intermediate domain's hosts are unaware of transit VDMs. A host being unaware of transit VDMs has two advantages. First, the host is not interrupted by the VDMs. Second, provided the CIO routers remained powered, the host can be placed into a sleep state.

Figure 38A:
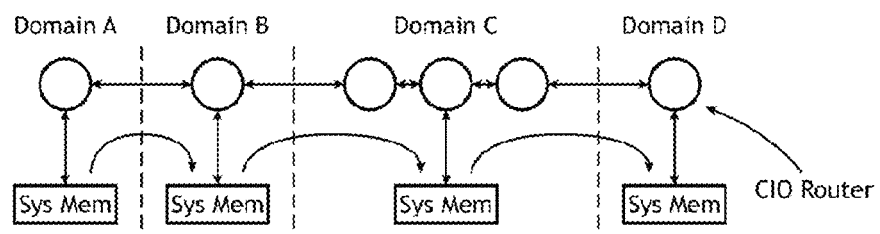
Figure 38B:
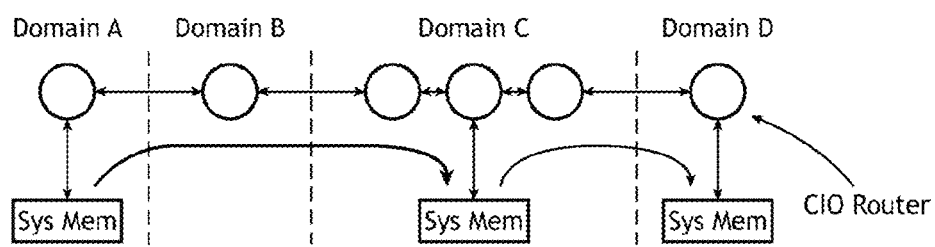

Of course, any level of hardware adds both complexity and cost to a device. The routing method described is scalar enough to allow most of the functions described for the MPU to be handled in software. FIGS. 38A and 38B illustrate embodiments where certain functions are carried out in software. A very simple MPU can be defined with the following functions:

1. Accept data block from the router's DMA resource and forward the block to the router's backbone (i.e., forward a message to an egress port).
2. Accept a message from the router's backbone (i.e., receive a message from an ingress port) and make the data block ready for DMA resource to fetch.

This level of MPU support then requires the domain's host to take on the responsibility of VDM formatting, decoding, and routing management. Each peer crossing for a VDM then requires the message to be placed into the domain's memory for the host to process it.

A network can be constructed with both software and hardware based peer-to-peer message support CIO routers intermixed. The performance through a given domain would be govern by the type of routers with in the domain.

In conclusion it can be seen that embodiments of the present invention provide elegant and efficient techniques for supporting peer-to-peer communications in an environment that does not otherwise support them.

While the above is a complete description of specific embodiments of the invention, the above description should not be taken as limiting the scope of the invention as defined by the claims.

What is claimed is:

1. A method comprising:
    determining, by a computer system in a first domain, that a peer-to-peer connection is to be made between the first domain and a second domain alien to the first domain, wherein the first domain is not yet connected to the second domain;
    sending, by the computer system, a request to the second domain for a first set of domain numbers, the first set having a size equal to one more than a number N1 of alien domains currently connected to the first domain, the number N1 of alien domains not including the second domain;
    receiving, by the computer system, the first set of domain numbers from the second domain;
    associating, by the computer system, a domain number in the first set of domain numbers with a domain number stored in a local list of domain numbers, the local list of domain numbers being specific to the first domain;
    receiving, by the computer system, a request from the second domain for a second set of domain numbers, the second set having a size equal to one more than a number N2 of alien domains currently connected to the second domain, the number N2 of alien domains not including the first domain;
    generating, by the computer system, the second set of domain number from a pool of available domain numbers; and
    sending, by the computer system, the second set of domain numbers to the second domain;
    wherein each domain number in the first and second sets of domain numbers identifies a Peripheral Component Interconnect Express (PCIe) hierarchy with a single PCIe root element.

2. The method of claim 1 wherein each domain number in the first and second sets of domain numbers is used to form the most significant bits of an address value.

3. The method of claim 2 wherein the address value is a PCIe address value.

4. The method of claim 1 further comprising:
    sending a message from the first domain to the second domain, the message being encoded as a PCIe vendor defined message (VDM).

5. The method of claim 1 wherein each of the first and second domains is a PCIe hierarchy with a single PCIe Root Element.

6. The method of claim 1 wherein each of the first and second domains is a self-contained system that includes a host and a CIO network.

7. A method comprising:
    storing, by a computer system in a first domain, a set of virtual domain numbers local to the first domain and corresponding to a first set of alien domains directly connected to the first domain and a second set of alien domains connected to the first set of alien domains;
    receiving, by the computer system on a port of a router in the first domain, a message from an alien domain in the first or second sets of alien domains, the message specifying an originating domain number and a target domain number;
    translating, by the computer system, the originating domain number and the target domain number using the set of virtual domain numbers, wherein the translated originating domain number is relative to a domain receiving the message and the translated target domain number is relative to domain sending the translated message; and
    forwarding, by the computer system, the translated message to a destination other than the alien domain in the first or second sets of alien domains from which the message was received,
    wherein each domain number is the set of virtual domain numbers identifies a Peripheral Component Interconnect Express (PCIe) hierarchy with a single PCIe root element.

8. The method of claim 1 wherein the peer-to-peer connection is to be made through a port of a router in the first domain, and wherein the determining comprises probing for a new endpoint at a second function of the port.

9. The method of claim 7 wherein the method further comprises translating a request identifier included in the message based on bus, device and function fields associated with the port.

10. The method of claim 7 wherein each of the first and second domains is a PCIe hierarchy with a single PCIe Root Element.

11. The method of claim 7 wherein each of the first and second domains is a self-contained system that includes a host and a CIO network.

12. A computer system configured to operate in a first domain, the computer system comprising:
    a hardware processor configured to:
        determine that a peer-to-peer connection is to be made between the first domain and a second domain alien to the first domain, wherein the first domain is not yet connected to the second domain;

send a request to the second domain for a first set of domain numbers, the first set having a size equal to one more than a number N1 of alien domains currently connected to the first domain, the number N1 of alien domains not including the second domain;

receive the first set of domain numbers from the second domain;

associate a domain number in the first set of domain numbers with a domain number stored in a local list of domain numbers, the local list of domain numbers being specific to the first domain;

receive a request from the second domain for a second set of domain numbers, the second set having a size equal to one more than a number N2 of alien domains currently connected to the second domain, the number N2 of alien domains not including the first domain;

generate the second set of domain numbers from a pool of available domain numbers; and send the second set of domain numbers to the second domain, wherein each domain number in the first and second sets of domain numbers identifies a Peripheral Component Interconnect Express (PCIe) hierarchy with a single PCIe root element.

13. The computer system of claim 12 wherein the first domain and the second domain are PCIe hierarchies.

14. The system of claim 12 wherein the first domain is a PCIe hierarchy with a single PCIe Root Element.

15. The system of claim 14 wherein the first domain includes one or more CIO routers and endpoints connected to the PCIe root element.

16. The system of claim 14 wherein the first domain is a self-contained system that includes a host and a CIO network.

17. A computer system configured to operate in a first domain, the computer system comprising:

a storage device configured to store a set of virtual domain numbers local to the first domain and corresponding to a first set of alien domains directly connected to the first domain and a second set of alien domains connected to the first set of alien domains; and a hardware processor configured to:

receive on a port of a router in the first domain, a message from an alien domain in the first or second sets of alien domains, the message specifying an originating domain number and a target domain number;

translate the originating domain number and the target domain number using the set of virtual domain numbers, wherein the translated originating domain number is relative to a domain receiving the message and the translated target domain number is relative to domain sending the translated message; and forward the translated message to a destination other than the alien domain in the first or second sets of alien domains from which the message was received, wherein each domain number is the set of virtual domain numbers identifies a Peripheral Component Interconnect Express (PCIe) hierarchy with a single PCIe root element.

18. The system of claim 17 wherein the first domain is a PCIe hierarchy with a single PCIe Root Element.

19. The system of claim 18 wherein the first domain includes one or more CIO routers and endpoints connected to the PCIe root element.

20. The system of claim 19 wherein the first domain is a self-contained system that includes a host and a CIO network.

* * * * *